(12) United States Patent
Chui

(10) Patent No.: US 6,898,288 B2
(45) Date of Patent: May 24, 2005

(54) METHOD AND SYSTEM FOR SECURE KEY EXCHANGE

(75) Inventor: Charles K. Chui, Menlo Park, CA (US)

(73) Assignee: Telesecura Corporation, Menlo Park, CA (US)

( * ) Notice: Subject to any disclaimer, the term of this patent is extended or adjusted under 35 U.S.C. 154(b) by 41 days.

(21) Appl. No.: 10/154,795

(22) Filed: May 23, 2002

(65) Prior Publication Data

US 2003/0076959 A1 Apr. 24, 2003

Related U.S. Application Data

(60) Provisional application No. 60/344,842, filed on Oct. 22, 2001.

(51) Int. Cl.[7] .................................................. H04L 9/00
(52) U.S. Cl. ........................................ 380/278; 380/40
(58) Field of Search ................................ 380/283, 277, 380/278, 37; 713/176, 168; 705/51, 71

(56) References Cited

U.S. PATENT DOCUMENTS

| | | | | | |
|---|---|---|---|---|---|
| 4,322,577 | A | * | 3/1982 | Brandstrom | 380/37 |
| 5,365,589 | A | * | 11/1994 | Gutowitz | 380/43 |
| 6,115,699 | A | * | 9/2000 | Hardjono | 705/51 |
| 6,223,287 | B1 | * | 4/2001 | Douglas et al. | 713/178 |
| 6,351,536 | B1 | * | 2/2002 | Sasaki | 380/44 |
| 6,389,532 | B1 | | 5/2002 | Gupta et al. | 713/60 |
| 6,425,081 | B1 | * | 7/2002 | Iwamura | 713/176 |
| 6,732,101 | B1 | * | 5/2004 | Cook | 707/10 |

OTHER PUBLICATIONS

Bruce Schneier, Applied Cryptography Second Edition: protocols, algorithms, and source code in C, 1996, Wiley & Sons, p., 516–517.*

* cited by examiner

*Primary Examiner*—Kim Vu
*Assistant Examiner*—Monplaisir Hamilton
(74) *Attorney, Agent, or Firm*—Morgan, Lewis & Bockius LLP

(57) ABSTRACT

A method for secure transmission of a data message locks, at the sender, the data message using a first lock. The locked data message is transmitted to the receiver. Next, the locked data message is double-locked, at the receiver, using a second lock. Then, this double-locked data message is transmitted back to the sender. The first lock of the double-locked data message is then unlocked, at the sender, using a first key, leaving the data message single-locked by the second lock. The single-locked data message is transmitted back to the receiver, where the second lock of the single-locked data message is unlocked, using a second key, to generate the data message, completing the secure transmission.

43 Claims, 25 Drawing Sheets

Sender · Intended Receiver

4x4 Lock Matrix 600

| $a_1$ | $a_2$ | $a_3$ | $a_4$ |
| --- | --- | --- | --- |
| $a_4$ | $a_1$ | $a_2$ | $a_3$ |
| $a_3$ | $a_4$ | $a_1$ | $a_2$ |
| $a_2$ | $a_3$ | $a_4$ | $a_1$ |

4x4 Key Matrix 602

| $b_1$ | $b_2$ | $b_3$ | $b_4$ |
| --- | --- | --- | --- |
| $b_4$ | $b_1$ | $b_2$ | $b_3$ |
| $b_3$ | $b_4$ | $b_1$ | $b_2$ |
| $b_2$ | $b_3$ | $b_4$ | $b_1$ |

FIG. 6A

6x6 Lock Matrix 610

| $a_1$ | $a_2$ | $a_3$ | $a_4$ | $a_5$ | $a_6$ |
| --- | --- | --- | --- | --- | --- |
| $a_6$ | $a_1$ | $a_2$ | $a_3$ | $a_4$ | $a_5$ |
| $a_5$ | $a_6$ | $a_1$ | $a_2$ | $a_3$ | $a_4$ |
| $a_4$ | $a_5$ | $a_6$ | $a_1$ | $a_2$ | $a_3$ |
| $a_3$ | $a_4$ | $a_5$ | $a_6$ | $a_1$ | $a_2$ |
| $a_2$ | $a_3$ | $a_4$ | $a_5$ | $a_6$ | $a_1$ |

6x6 Key Matrix 612

| $b_1$ | $b_2$ | $b_3$ | $b_4$ | $b_5$ | $b_6$ |
| --- | --- | --- | --- | --- | --- |
| $b_6$ | $b_1$ | $b_2$ | $b_3$ | $b_4$ | $b_5$ |
| $b_5$ | $b_6$ | $b_1$ | $b_2$ | $b_3$ | $b_4$ |
| $b_4$ | $b_5$ | $b_6$ | $b_1$ | $b_2$ | $b_3$ |
| $b_3$ | $b_4$ | $b_5$ | $b_6$ | $b_1$ | $b_2$ |
| $b_2$ | $b_3$ | $b_4$ | $b_5$ | $b_6$ | $b_1$ |

FIG. 6B

Compute:

$$A_1 = a_1 - a_2 + a_3 - a_4$$
$$A_2 = (a_1 - a_3)^2 + (a_2 - a_4)^2$$

FIG. 7A
(UNIT A in FIG. 7 for $k = 4$)

Are both $A_1 \neq 0$ and $A_2 \neq 0$ ?

If no, ask generator to replace $a_1, a_2, a_3, a_4$ one at a time in this order.

If yes, output $a_1, a_2, a_3, a_4$ to Memory 720 and UNIT C (718), and $A_1, A_2$ to UNIT C also.

FIG. 7B
(UNIT B in FIG. 7 for $k = 4$)

Compute:

$$d_0 = \frac{1}{4(a_1 + a_2 + a_3 + a_4)} \; ; \quad d_1 = \frac{1}{4A_1}$$

$$d_2 = \frac{a_1 - a_3}{2A_2} \; ; \quad d_3 = \frac{a_2 - a_4}{2A_2}$$

$$b_1 = d_0 + d_1 + d_2 \; ; \quad b_2 = d_0 - d_1 - d_3$$

$$b_3 = d_0 + d_1 - d_2 \; ; \quad b_4 = d_0 - d_1 + d_3$$

Output $b_1, b_2, b_3, b_4$ to Memory 720.

FIG. 7C
(UNIT C in FIG. 7 for $k = 4$)

Compute :

$$c_0 = a_1 + a_3 + a_5 \;\; ; \;\; d_0 = a_2 + a_4 + a_6$$

$$c_1 = 3a_1 - c_0 \;\; ; \;\; d_1 = 3a_4 - d_0$$

$$g = a_2 + a_3 - a_5 - a_6 \;\; ; \;\; h = a_2 - a_3 + a_5 - a_6$$

FIG. 7D
(UNIT A in FIG. 7 for $k = 6$)

Ensure all of the following are satisfied :

(i) $c_0 \neq d_0$, (ii) $c_1 \neq d_1$ or $g \neq 0$, and (iii) $c_1 \neq -d_1$ or $h \neq 0$.

If at least one of (i), (ii), and (iii) fails, regenerate $a_1, a_2, a_3, a_4, a_5, a_6$ one at a time till all (i), (ii), and (iii) hold.

Then output $a_1, a_2, a_3, a_4, a_5, a_6$ to Memory 114, and $a_2, a_3, a_5, a_6, c_0, d_0, c_1, d_1, g, h$ to UNIT C, 113.

FIG. 7E
(UNIT C in FIG. 7 for $k = 6$)

Compute :

$c_2 = 3a_3 - c_0$ ;  $d_2 = 3a_6 - d_0$ $c_3 = 3a_5 - c_0$ ;  $d_3 = 3a_2 - d_0$ $A_0 = 3(c_0^2 - d_0^2)$ ;  $e_0 = \dfrac{c_0}{A_0}$ ;  $f_0 = \dfrac{-d_0}{A_0}$ $e_1 = c_1 - d_1$ ;  $f_1 = c_1 + d_1$ $e_2 = c_2 - d_2$ ;  $f_2 = c_2 + d_2$ $e_3 = c_3 - d_3$ ;  $f_3 = c_3 + d_3$ $A_1 = \dfrac{3}{2}(e_1^2 + 3g^2)$ ;  $A_2 = \dfrac{3}{2}(f_1^2 + 3h^2)$ $b_1 = e_0 + \dfrac{e_1}{A_1} + \dfrac{f_1}{A_2}$ ;  $b_2 = f_0 - \dfrac{e_2}{A_1} + \dfrac{f_2}{A_2}$ $b_3 = e_0 + \dfrac{e_3}{A_1} + \dfrac{f_3}{A_2}$ ;  $b_4 = f_0 - \dfrac{e_1}{A_1} + \dfrac{f_1}{A_2}$ $b_5 = e_0 + \dfrac{e_2}{A_1} + \dfrac{f_2}{A_2}$ ;  $b_6 = f_0 - \dfrac{e_3}{A_1} + \dfrac{f_3}{A_2}$ Output $b_1, b_2, b_3, b_4, b_5, b_6$ to Memory 114.

FIG. 7F
(UNIT C in FIG. 7 for $k = 6$)

| CODE TABLE for pre-encryption for k = 4 |
|---|
| (a, b distinct non-negative integers) |
| a b ⟷ a b a b |
| a a b ⟷ a a b b |
| a a a b ⟷ a b b a |
| a ⟷ a −1 a −1 |
| a a ⟷ a −2 a −2 |
| a a a ⟷ a −3 a −3 |
| a a a a ⟷ a −4 a −4 |

FIG. 9A

| Example of Pre-encryption coding (sentences with k = 4) ||
|---|---|
| Partitioned blocks 900 | Encoded blocks 902 |
| 6 5, 0 0 1, 8 8 7, 2 2 2 3, 3 4, 9 5, 6 6 6 6, 6 7, 1 0, 0 0 0 0, 4 3, 3 3 3 | 6 5 6 5, 0 0 1 1, 8 8 7 7, 2 3 3 2, 3 4 3 4, 9 5 9 5, 6 −4 6 −4, 6 7 6 7, 1 0 1 0 0 −4 0 −4, 4 3 4 3, 3 −3 3 −3 |

FIG. 9B

Preparation for pre-encryption coding for k = 6

(1) When all 5 numbers are the same $$a\,a\,a\,a\,a \rightarrow a\,a\,a\,-1\,-1$$

(2) When there are less than 5 numbers in the last block (at the end of the number sequence) to be coded $$x_n \rightarrow x_n\,-1\ 0\ 0\ 0$$
$$x_{n-1}\ x_n \rightarrow x_{n-1}\ x_n\,-1\ 0\ 0$$
$$x_{n-2}\ x_{n-1}\ x_n \rightarrow x_{n-2}\ x_{n-1}\ x_n\,-1\ 0$$
$$x_{n-3}\ x_{n-2}\ x_{n-1}\ x_n \rightarrow x_{n-3}\ x_{n-2}\ x_{n-1}\ x_n\,-1$$

FIG. 10A

CODE TABLE
for pre-encryption for $k = 6$ $$x_1\ x_2\ x_3\ x_4\ x_5 \rightarrow x_1\ x_2\ x_3\ x_4\ x_5\ x_6$$

with $$x_6 = x_1 - x_2 + x_3 - x_4 + x_5$$

Fig. 10B

| Example of Pre-encryption coding (sentences with k = 6) ||
|---|---|
| Partitioned blocks 1000 | Encoded blocks 1002 |
| 6 5 0 0 1, 8 8 7 2 2, 2 3 3 4 9, 6 6 6 6 6, 7 1 0 0 0, 0 0 4 3 3, 3 3 | 6 5 0 0 1 2, 8 8 7 2 2 7, 2 3 3 4 9 7, 6 6 6 -1 -1 6, 7 1 0 0 0 6, 0 0 4 3 3 4, 3 3 -1 0 0 -1 |

METHOD AND SYSTEM FOR SECURE KEY EXCHANGE

RELATED APPLICATIONS

This application claims priority to U.S. Provisional Application No. 60/344,842, filed Oct. 22, 2001, which is hereby incorporated by reference.

The present invention relates generally to cryptography, and in particular, to a method for secure secret key exchange without using a public key.

BACKGROUND OF THE INVENTION

Public-key cryptography, or asymmetric-key cryptography, underlies many network transactions that occur today. Unlike symmetric-key cryptography, which relies upon a single key to both encrypt and decrypt data, public-key cryptography uses a pair of keys—a public key and a private key. A public key and private key are related in that information encrypted with a public key can be decrypted by the corresponding private key, and vice-versa. The public key is published while the private key is kept secret. If a sender of data authenticates that a published public key originated from a desired recipient (generally established through a trusted source, such as a certificate authority on the Internet), the sender can then encrypt the data to be sent using the public key, and, in theory, only the desired recipient (as the sole party in possession of the private key) can decrypt it.

Another use of public-key cryptography is digital signatures, which is a method to verify that a message was actually sent by the party expected to send it. When a sending party wishes to digitally sign a message for verification purposes, it uses its private key to encrypt a hash table (also known as a message digest) representation of the message itself. Then, the recipient can use the public key of the sender, authenticated by a trusted source, to decrypt the digital signature. If the recipient successfully decrypts the hash table, unique to the message being sent, with the authenticated private key, this verifies that the message was sent by the expected sender. This is true because, in theory, the message could only have originated from the expected sender, since it is the only party in possession of the private key corresponding to the public key used to decrypt the signature.

Encryption strength is related to the difficulty of discovering the key, which in turn depends on both the cryptographic algorithm (generally called a "cipher"), and the length of the key. (The ciphers themselves are published for evaluation by the cryptographic community, leaving only the key unknown.) For example, the difficulty of discovering the key for the RSA cipher (most commonly used for public-key encryption) depends on the difficulty of factoring large numbers, a well-known mathematical problem. In general, longer keys provide stronger encryption. Thus, a 128-bit key used with a particular cipher will provide much better cryptographic protection than a 40-bit key used with the same cipher.

Similarly, different ciphers may require different key lengths to achieve the same level of encryption strength. For example, the RSA cipher used for public-key encryption can only use a subset of all possible values for a key of a given length, due to the nature of the mathematical problem on which it is based. Other ciphers, such as those used for symmetric key encryption, can use all possible values for a key of a given length, rather than a subset of those values. Thus, a 128-bit key for use with a symmetric-key encryption cipher would provide stronger encryption than a 128-bit key for use with the RSA public-key encryption cipher. In practice, the RSA public-key encryption cipher (the most common form of public-key encryption) must use at least a 512-bit key to be considered cryptographically "strong," whereas symmetric key ciphers can achieve approximately the same level of strength with a 64-bit key.

There are different methods to break encryption. The most basic method is the "brute force" method, in which a hacker might try every possible key, which, in theory, is guaranteed to result in success eventually. Other methods are cipher-specific. For example, generating public-private key pairs using the RSA cipher requires a "modulus" (i.e., key) that is comprised of two prime numbers, "p" and "q." To determine a RSA private key from a RSA public key (and hence break the encryption), the modulus must be factored into "p" and "q." This is a particularly difficult task as the size of the modulus increases. Thus, if a modulus is 512 bits, it must be factored into two 256-bit prime numbers ("p" and "q") to break the encryption. In 1997, a specific assessment of the security of the 512-bit RSA keys showed that one may be factored for less than one million dollars and eight months of effort, and in 1999, the 512-bit number RSA-155 was factored in seven months. This means that 512-bit keys no longer provide sufficient security for anything more than very short-term security needs. RSA laboratories currently recommends key sizes of 1024 bits for corporate use, and 2048 bits for extremely valuable keys. The problems with using such long-length keys will be discussed further below.

The rate at which encryption schemes are broken continues to increase. This is true, in part, because processor capacity continues to double approximately every 18 months, in accordance with Moore's law. Weaker encryption can now be decrypted by using distributed processing over a relatively small number of computers. Because public-key encryption is, on average, weaker than symmetric-key encryption, it is particularly susceptible to cracking. However, it is also not feasible to simply increase the length of public keys, as it takes a substantial amount of time to encrypt and decrypt data using a very long key. For example, doubling the modulus of a RSA key will increase the time required for public key operations (such as encryption and signature verification) by a factor of four, on average, and will increase the time taken by private key operations (such as decryption and digital signing) by a factor of eight, on average. Further, key generation time will increase by a factor of 16 if the modulus is doubled.

The increased processing time for cryptographic operations using long keys is problematic in systems requiring fast communications, and for large-scale, multiple-computer request processing (e.g., an Internet server). Similarly, portable electronic devices generally cannot support the level of processing required for longer-length keys to ensure secure communications. For example, devices such as cell phones, PDAs, and facsimile machines have very limited processing capabilities, and would not be able to readily perform public or private key operations with the length of keys required for secure communications. Thus, because public-key cryptography is a time-consuming and processor-intensive means to securely exchange data, it is oftentimes used only initially to setup a secure exchange to be conducted using symmetric keys. There are two principal ways in which this occurs.

In one public-key/symmetric key encryption scheme, for each message to be transmitted, a temporary random "session" key of fixed length, typically shorter than the message itself, is generated. The session key is encrypted by using a public-key algorithm and the intended recipient's public key, and appended to the front of the message to be sent. The original message is then encrypted using a faster symmetric-key algorithm, utilizing the session key. The entire message thus includes the public-key-encrypted session key, followed by the session-key-encrypted original message. Upon receipt, the recipient (whose public key was used to encrypt the session key) uses its corresponding private key to decrypt the session key. The recipient then uses the decrypted session key to decrypt, at a faster rate than could be done with the public/private keys, the original message. In this scenario, the generation of a random session key occurs for each transmitted message.

In another public-key/symmetric key encryption scheme, a session key is generated for an entire communications session. In this scheme, only the session key, after being encrypted by the intended receiver's public key, is sent to the recipient. The recipient decrypts the session key using its private key. Then, the session key, now in possession of both the sender and recipient, is used in conjunction with a symmetric-key algorithm to rapidly encrypt and decrypt data that is communicated between the parties, at a much faster rate than could be accomplished using the public or private keys. The same session key can be used throughout the communications session (e.g., receiving a streaming video over the Internet) without having to conduct another public-key cryptography operation.

A common type of session key is a 64-bit Data Encryption Standard (DES) key for use with the DES cipher. The DES cipher is a block cipher, meaning that it takes a 64-bit data message as input (also referred to as "plaintext"), and outputs a 64-bit encrypted data message (also referred to as "ciphertext"). Block ciphers like DES are much faster than the calculations required for public-key algorithms like RSA.

The principal problem with symmetric keys (or "secret" keys) is finding a method to securely exchange them. As described above, with the advent of public-key cryptography, this problem has been substantially resolved. Therefore, the optimum combination of security and speed provided by dual public-key/symmetric-key encryption schemes (e.g., RGA/DES) underlie many encryption schemes currently in use on the Internet, like the SSL (Secure Sockets Layer) Handshake protocol.

A representation of a public-key encryption exchange of a symmetric key is shown in FIG. 1. As shown, the Sender wishes to provide a session key, "k," to the Intended Receiver. The Receiver has a public/private key pair, "e, d," compatible with a cipher such as RSA. The Receiver provides its public key "e" to the Sender, which as shown occurs directly, but can also occur indirectly through a trusted source like a certificate authority, which can verify its authenticity. Using this public key, the Sender encrypts the session key to generate encrypted session key "1" (i.e., "$E_e(k)=1$"). It then transmits the encrypted key to the Receiver, which decrypts it using its corresponding private key "d" to generate the original key "k" (i.e., "$D_d(1)=k$").

A public-key encrypted exchange of a symmetric key can also occur for multiple intended receivers for group communications, as shown in FIG. 2. In this context, each intended receiver will have its own public/private key pair (i.e. "$e_1, d_1$" for Intended Receiver 1; "$e_2, d_2$" for Intended Receiver 2; "$e_3, d_3$" for Intended Receiver 3). The Sender will separately encrypt the session key using each Intended Receiver's public key, which is then uniquely decryptable by only the appropriate Intended Receiver. Each version of the encrypted key (i.e., "$1_1$," "$1_2$," "$1_3$") will be entirely distinct from the other versions, but the end-result decrypted session key "k" will be the same for each Receiver.

One problem of the public-key/symmetric-key encryption scheme is what is commonly referred to as the "man-in-the-middle" problem. In this situation, an adversary interjects itself between the sender and the intended receiver, masquerading as the intended receiver to the sender, and as the sender to the intended receiver. This scenario is shown in FIG. 3. In this case, as with FIG. 1, a Sender is attempting to send a key "k" to the Intended Receiver.

However, this time an Adversary intercepts the Intended Receiver's public key "e," and then provides its own public key "f" to the Sender instead. The Sender unknowingly uses the Adversary's public key to encrypt "k," generating encrypted key "t," which the Sender attempts to send to the Intended Receiver, but which is again intercepted by the Adversary. The Adversary uses its corresponding private key "g" to decrypt the symmetric key "k" sent by the Sender. The Adversary can now communicate freely with the Sender using the symmetric key, "k."

Next, the Adversary encrypts the now-decrypted symmetric key "k" (or, alternatively, the Adversary's own symmetric key) with the intercepted public key "e" of the Intended Receiver, which it then sends to the Intended Receiver. The Intended Receiver, not realizing it is being duped and thinking that it has just received the Sender's encrypted symmetric key, decrypts the key using its corresponding private key "d." The Intended Receiver can now freely communicate securely with the Adversary, which it thinks is the Sender. As the "man-in-the-middle," the Adversary can intercept messages from the Sender to the Intended Receiver, or vice-versa, decrypt them, and then send them on or modify them as desired. It is difficult with this arrangement to detect the Adversary.

One way to avoid this issue, however, is to use a trusted source like a certificate authority to obtain public keys, which authenticates that a public key originates from a desired intended recipient. However, this is not always practical or possible. Having trusted sources requires a substantial infrastructure, which is not always feasible outside of the context of large networks like the Internet. Also, while the certificate authorities provide public-key verification for many major Internet sites, it would be impractical to keep an authenticated list of public keys for every individual user or computer on a wide-area network, for example. Furthermore, even if a trusted source of public keys is available, monitoring and accessing the trusted source to obtain dynamically changing content would consume substantial resources. This is particularly true if trusted sources must be accessed every time a communication is initiated. Also, obtaining and maintaining a table of public keys would be a very difficult undertaking for personal electronic devices like cell phones or facsimile machines.

For these reasons, it is desirable to have a method and system for secure key exchange that does not utilize public-key cryptography, while being simple enough to be used by devices like cell phones and facsimile machines having minimal processing capacity.

SUMMARY OF THE INVENTION

In one embodiment, the present invention is a method for secure transmission of a data message between a sender and a receiver. The method includes locking, at the sender, the data message using a first lock, and transmitting the locked data message to the receiver. Next, the locked data message is double-locked, at the receiver, using a second lock, and then this double-locked data message is transmitted back to the sender. The first lock of the double-locked data message is then unlocked, at the sender, using a first key, leaving the data message single-locked by the second lock. The single-locked data message is transmitted back to the receiver, where the second lock of the single-locked data message is unlocked, using a second key, to generate the data message.

In another embodiment, the present invention is a method for secure key exchange between a sender and a receiver. The method includes encrypting, at the sender, a secret key to be transmitted from the sender to the receiver, using one or more locks of a plurality of sender lock-key pairs. Then, the sender-encrypted secret key is transmitted to the receiver, where it is encrypted, using one or more locks of a plurality of receiver lock-key pairs. The receiver- and sender-encrypted secret key is then transmitted back to the sender. At the sender, the sender-encrypted portion of the receiver- and sender-encrypted secret key is decrypted, using one or more keys of the plurality of sender lock-key pairs, leaving the secret key receiver-encrypted. The receiver-encrypted secret key is transmitted back to the receiver, where it is decrypted using one or more keys of the plurality of receiver lock-key pairs, to generate the secret key.

In yet another embodiment, the present invention is a secure transmission module for securely transmitting a data message to at least one receiver. The module includes a plurality of lock-key pairs, and an encryption module for encrypting a data message using one or more locks of the plurality of lock-key pairs. Additionally, the module includes a commutative decryption module for decrypting encryption applied by the encryption module to the data message, using one or more keys of the plurality of lock-key pairs. This decryption occurs after the data message has been additionally encrypted at least once more at the at least one receiver. Finally, the module includes a communication module for transmitting encrypted data messages and commutatively-decrypted data messages to the at least one receiver. The communication module is also for receiving additionally-encrypted data messages from the at least one receiver.

In a further embodiment, the present invention is a secure receiver module for securely receiving a data message from a sender. The module includes a plurality of lock-key pairs, and a double-encryption module for encrypting an already-encrypted data message, using one or more locks of the plurality of lock-key pairs. Additionally, the module includes a decryption module for decrypting encryption applied by the double-encryption module to a data message, utilizing one or more keys of the plurality of lock-key pairs, to generate the data message from the sender. The decryption occurs after the already-encrypted portion of the data message has been commutatively decrypted at the sender. Finally, the module includes a communication module for receiving already-encrypted data messages and commutatively-decrypted data messages from the sender. The communication module is also for transmitting double-encrypted data messages to the sender.

BRIEF DESCRIPTION OF THE DRAWINGS

Additional objects and features of the invention will be more readily apparent from the following detailed description and appended claims when taken in conjunction with the drawings, in which:

FIG. 6A depicts a schematic of four-number lock and key matrices, utilized in accordance with one embodiment of the present invention.

FIG. 6B depicts a schematic of six-number lock and key matrices, utilized in accordance with another embodiment of the present invention.

FIG. 7A presents further detail on Unit A of FIG. 7, relating to preliminary calculations in the process of generating four-number lock-key pairs.

FIG. 7B presents further detail on Unit B of FIG. 7, relating to verification of locks in the process of generating four-number lock-key pairs.

FIG. 7C presents further detail on Unit C of FIG. 7, relating to computing keys in the process of generating four-number lock-key pairs.

FIG. 7D presents further detail on Unit A of FIG. 7, relating to preliminary calculations in the process of generating six-number lock-key pairs.

FIG. 7E presents further detail on Unit B of FIG. 7, relating to verification of locks in the process of generating six-number lock-key pairs.

FIG. 7F presents further detail on Unit C of FIG. 7, relating to computing keys in the process of generating six-number lock-key pairs.

FIG. 9A is an exemplary embodiment of a coding table used for pre-encryption coding for four-number lock-key pair systems.

FIG. 9B shows an example of a series of secret numbers (e.g., a key) coded using the coding table of FIG. 9A.

FIG. 10A presents a method of preparation for pre-encryption coding for six-number lock-key pair systems, in accordance with one embodiment of the present invention.

FIG. 10B shows an exemplary embodiment of a coding table used for pre-encryption coding for six-number lock-key pair systems.

FIG. 10C shows an example of a series of secret numbers (e.g., a key) coded using the coding table of FIG. 10B.

DETAILED DESCRIPTION OF THE PREFERRED EMBODIMENTS

Figure 1:
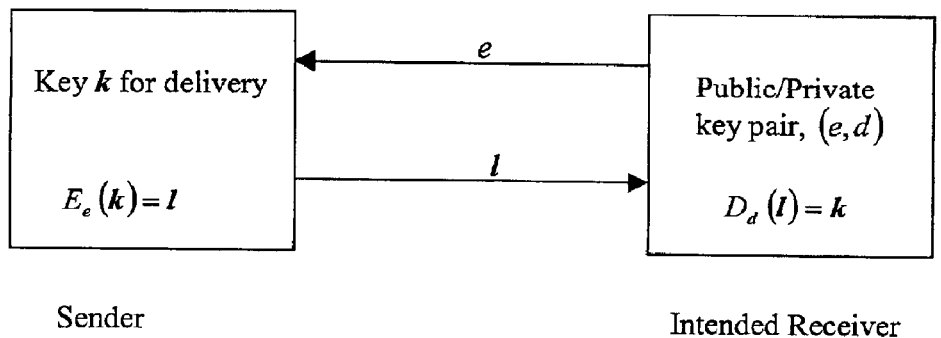
FIG. 1 is a block diagram of a prior-art method of key exchange between a single sender and a single receiver, using public-key cryptography.
Figure 2:
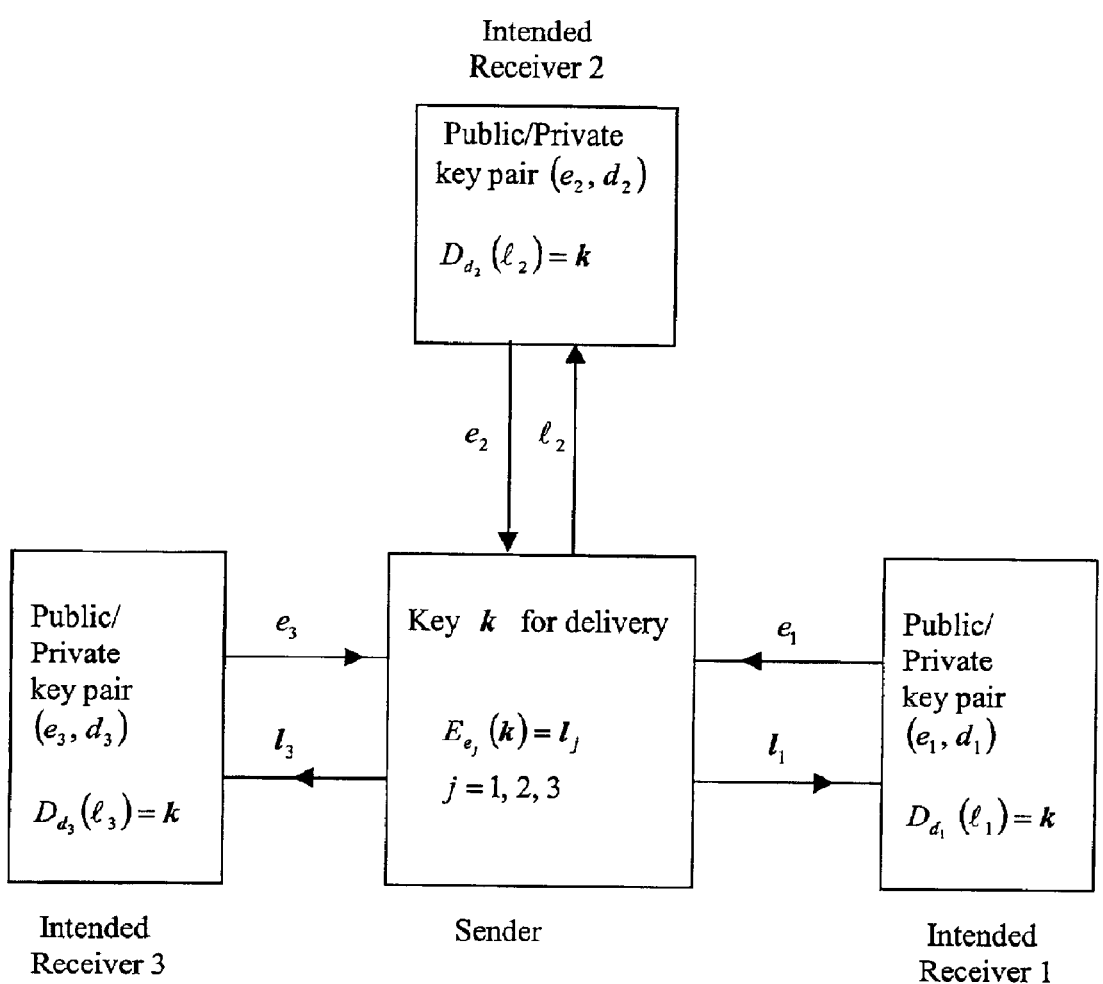
FIG. 2 is a block diagram of the prior-art method of key exchange between a single sender and multiple receivers, using public-key cryptography.
Figure 3:
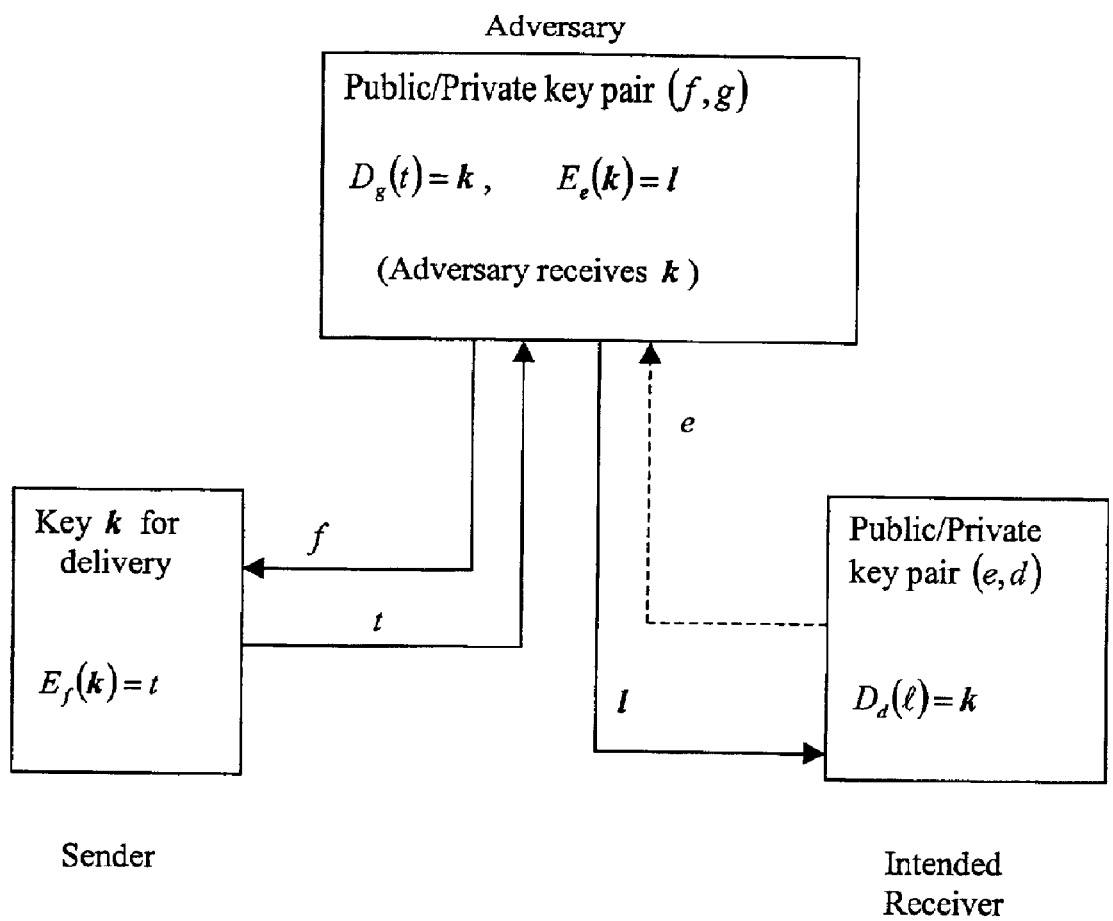
FIG. 3 is a block diagram demonstrating the "man-in-the-middle" adversary problem of the prior art method of FIGS. 1 and 2.

Note that, as used herein, a "secret key" means any key which provides security benefits by not being publicly known. A secret key is, most commonly, a symmetric key (the two terms are used interchangeably herein), but a secret key does not have to be a symmetric under this definition. Also, the term "session key" is used interchangeably herein with "secret key." Further, a "data message" may comprise a secret key, text, numerical data, financial transaction data, facsimile data, or any other type of data or information that a sender desires to transmit to a recipient. Also, the data to be included in a data message may be encoded, in addition to being encrypted using the techniques of the present invention.

Generally, in a preferred embodiment, the invention is a method to securely exchange a secret key, or to securely transmit a data message, such as a digital signature or digital envelope. The method does not require the various components of a PKI (public key infrastructure), such as certificate and registration authorities to provide public key verification. Instead, the sender and receiver exchange the key or data message using encryption generated, applied, and decrypted separately at each individual party to the communication, without the transmission of any public encryption key.

Specifically, a sender wishing to send, for example, a secret key would first encode the key. This occurs by using a code table that first partitions the secret key into blocks of integers up to a predetermined number of integers, based on a partitioning methodology. Then, using the code table, all of the varying-length blocks are converted into encoded blocks of equal length, for example four-integer encoded blocks.

Before transmission, the sender uses locks to encrypt the encoded blocks. The locks are generally not generated at the time of the transmission of the data, but rather are generated earlier before conducting any secure communications, and can be used for more than one transmission. For enhanced security, the lock-key pairs are also regenerated periodically—for example, they might be generated in a portable electronic device (for example, the device shown in FIG. 12) every time the batteries are recharged. To actually generate the lock-key pairs, a lock-key generator obtains a sequence of randomly generated numbers, which are generated either by a random number generator, or by random user input such as pushing the number keys on a cell phone. The random numbers are used as the locks of a lock-key pair, as the basis for an encryption system. If matrix multiplication is used for the encryption system, then to be able to successfully decrypt data encrypted by the random number locks of the matrix, however, the matrix must be invertible, which is determined by plugging the random numbers into verification equations.

Again, for a matrix multiplication based encryption system, if the encryption matrix is invertible, keys corresponding to the random-number locks are generated by plugging the random numbers into separate equations that compute the inverse matrix to the matrix formed by the random-number-lock matrix. In this way, the lock-key pair generator develops a key for each lock at each position in the matrix. The lock-key pairs are then stored in memory.

To encrypt the encoded blocks of the secret key, a lock is randomly selected from memory for each encoded block of the secret key. To ensure that the identity of the lock used to encrypt a particular code sentence is not lost, the corresponding key (or the identity of the key) of the lock-key pair is stored in cache memory, for later retrieval. Then, using an encryption algorithm that converts, for example, a four-integer lock into a 4×4 matrix, each integer of an encoded block is matrix-multiplied against the lock matrix, thereby encrypting the encoded blocks of the secret key.

Next, the encrypted and encoded secret key, treated as plaintext, is transmitted to an intended receiver. The intended receiver has generated its own supply of lock-key pairs, also utilizing random number matrices for the locks, and inverted matrices for the keys. The receiver double-locks the encrypted secret key—in other words, it randomly selects lock-key pairs from memory to use to double-encrypt each already-encrypted block of the secret key, using the same process as described previously for the sender. Next, the double-encrypted secret key is transmitted back to the sender. The sender now retrieves its cached set of keys, in a sequential order corresponding to the order of encryption, and uses the keys, one by one, to decrypt the sender-encrypted portion of the double-encrypted secret key. The sender's key must be commutative with the receiver's lock. The simplest system is an additive system in which the lock is performed by adding random numbers modulo p (for example p=10), and the key is performed by subtracting the same numbers. This is done by both the sender and receiver using different random numbers. A more secure system involves matrix multiplication as in the preferred embodiment. By performing the same matrix multiplication as with a lock, but with the keys instead (representing an inverted matrix), the original sender encryption is decrypted, despite the fact that an additional layer of encryption was added by the receiver. It is the commutative property, A×B=B×A, that allows the original sender-encryption to be commutatively decrypted.

At this point, the secret key remains receiver-encrypted only (in addition to being encoded), for which the receiver has the key. Thus, the receiver-encrypted key is transmitted back to the receiver, where, again using the cached keys corresponding to the locks used to double-encrypt the secret message, the receiver-encrypted portion of the secret key is decrypted, using the same decryption process described above. At this point, the recipient is in possession of the fully decrypted secret key, which now remains only coded. The code table is then applied in reverse, or a decoding table is utilized. In either case, the end result is the now decoded secret key—the same secret key that the sender wished to securely exchange with the recipient.

Figure 4A:
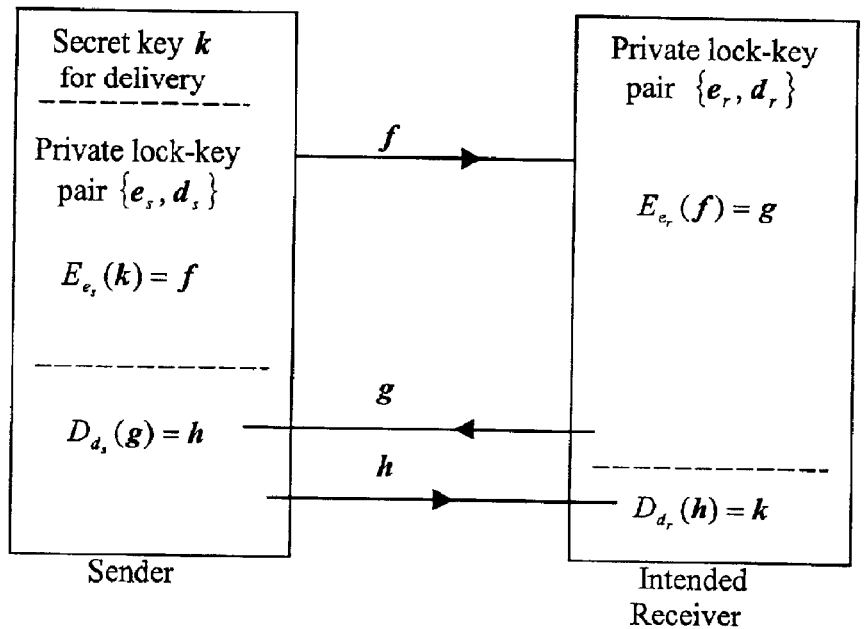
FIG. 4A is a block diagram showing a method for secure key exchange between a single sender and a single receiver, in accordance with one embodiment of the present invention.

Referring to FIG. 4A, a method of secure key exchange in accordance with one embodiment of the present invention is shown, providing further detail of aspects of the method of secure key exchange described above. In this figure, the Sender has a secret key "k" that it wishes to send to the Intended Receiver. Both parties have generated private lock-key pairs ("$e_s$, $d_s$" for the Sender, "$e_r$, $d_r$" for the Receiver). The Sender encrypts "k" with its private encryption lock "$e_s$" ("$E_{es}(k)=f$"), and then transmits the sender-encrypted "f" to the Receiver. The Receiver encrypts "f" with its own private encryption lock "$e_r$" ("$E_{er}(f)=g$"), and then transmits the now receiver- and sender-encrypted (i.e., double-encrypted) secret key, "g," back to the Sender. The Sender now uses its private key "$d_s$" to commutatively decrypt "g", meaning that it decrypts the sender-encrypted portion of "g" from "behind" the receiver-encrypted portion of "g" ("$D_{ds}(g)=h$"). The encrypted secret key "h," now only receiver-encrypted, is transmitted back to the Receiver. Finally, the Receiver decrypts its own encryption on "h" using its private key "$d_r$," to generate the original secret key "k" that Sender wished to send to the Receiver.

Figure 4B:
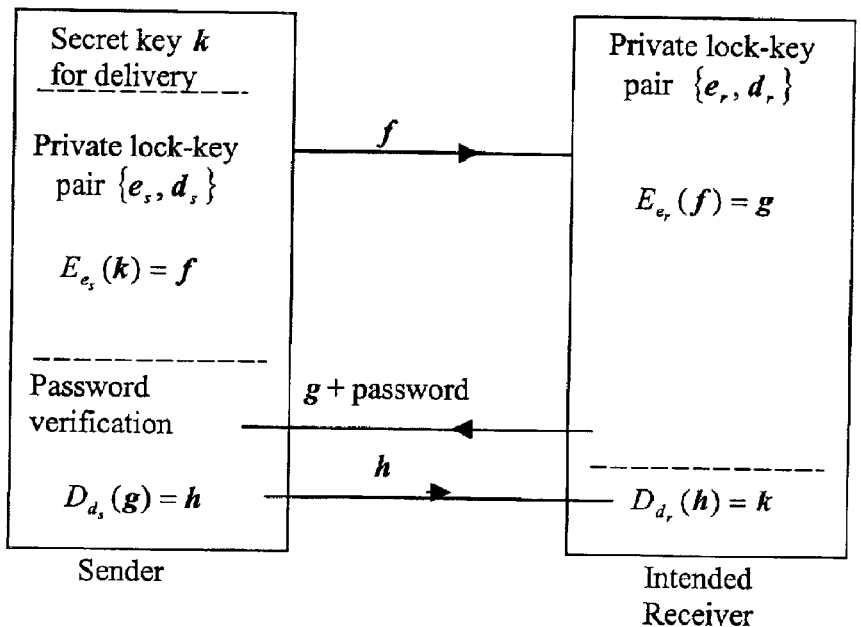
FIG. 4B is a block diagram showing the method of claim 4A, further including password-based verification of the identity of the intended receiver.

Referring to FIG. 4B, the same method of secure exchange as FIG. 4A is shown, with one addition—the Sender verifies that the party transmitting the sender- and receiver-encrypted key "g" is in fact the Intended Receiver. It does this by requiring, and receiving, a password from the Receiver when it transmits "g" back to the Sender. The password can be known in advance by the Receiver, if the Sender has provided the password to the Receiver to authorize secure communications between the two. Or, the Sender can pose a question (not shown), or have a standing question, that only the Receiver would know the answer to, which constitutes the password. Either way, the password should identify that the party the Sender is communicating with is in fact the Intended Receiver. This decreases the probability of a successful "man-in-the-middle" attack.

Figure 5A:
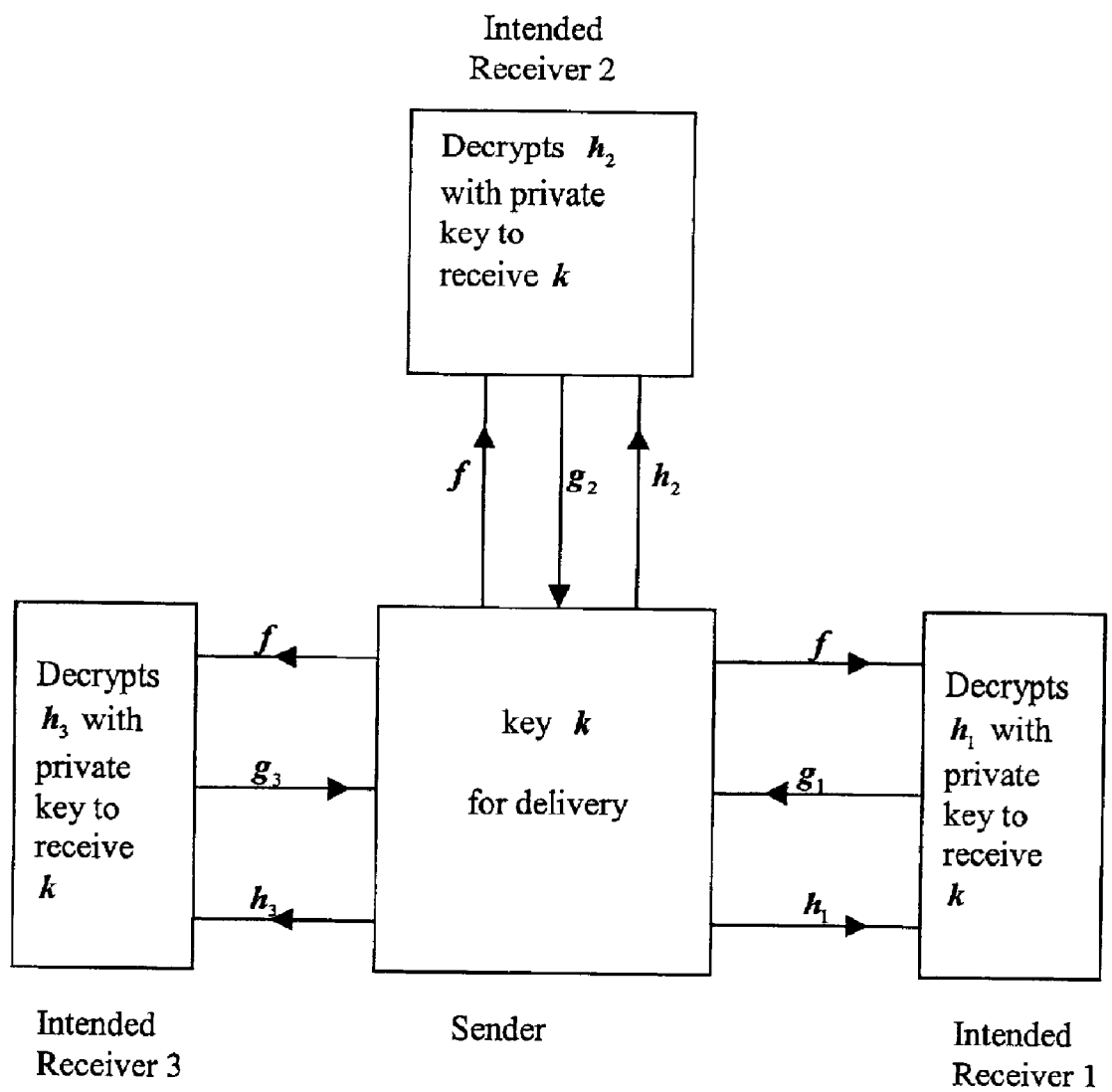
FIG. 5A is block diagram of an exemplary embodiment of the present invention, showing a method for secure key exchange between a single sender and multiple receivers.

Turning to FIG. 5A, the same method for secure key exchange as shown in FIG. 4A is depicted, but in this case, the Sender wishes to send the secret key "k" to multiple Intended Receivers. Like in the single intended-receiver context, the Sender applies its private lock to "k" to generate the sender-encrypted secret key "f." The sender-encrypted key is sent to three separate Intended Receivers. Of course, each Intended Receiver will have its own set of private keys and locks, separate and distinct from the other Intended Receivers. Thus, the individual double-encryption applied to "f" results in different receiver- and sender-encrypted secret keys for each Intended Receiver (i.e., "$g_1$" for Receiver 1, "$g_2$," for Receiver 2, and "$g_3$" for Receiver 3), all three of which are transmitted back to the Sender. Now, using its private key, the Sender decrypts all three double-encrypted keys "$g_1$," "$g_2$," and "$g_3$," using the same decryption key and methodology for all three to produce three different receiver-encrypted-only keys, "$h_1$," "$h_2$," "$h_3$." Finally, the Sender sends each of the three receiver-encrypted-only keys "$h_1$," "$h_2$," "$h_3$," which are distinct for each intended Receiver, to the appropriate Receiver. Each Receiver decrypts its respective receiver-encrypted key to generate the original secret key "k" that the Sender wished to send. Each Receiver should have the exact same key.

Figure 5B:
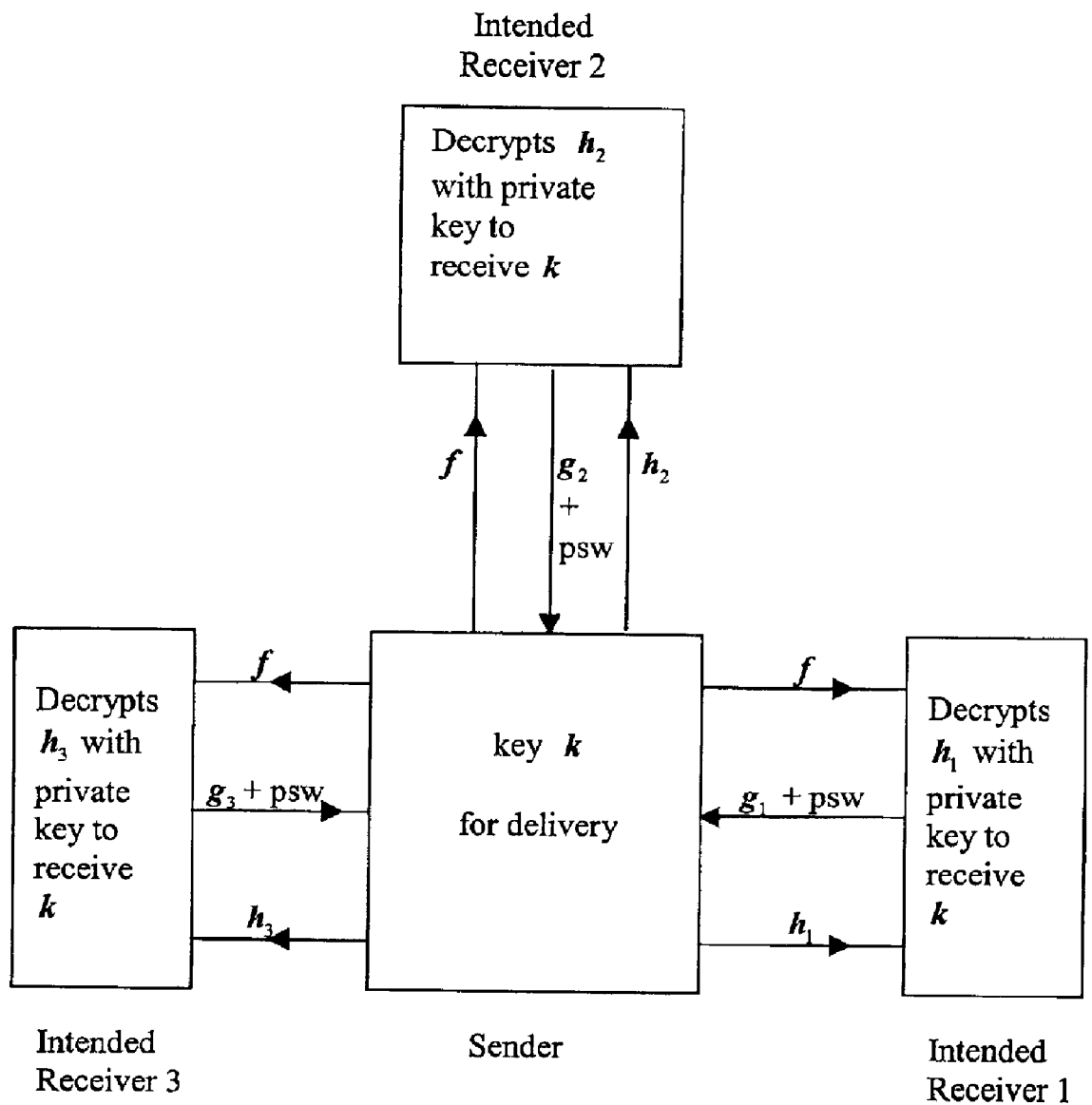
FIG. 5B is a block diagram showing the method of claim 5A, further including password-based verification of the identity of the intended receiver.

The schematic shown in FIG. 5B is the same as FIG. 5A, with the addition that password ("psw") verification has been added, which is utilized in the same manner as described with the password verification in FIG. 4B.

Figure 5C:
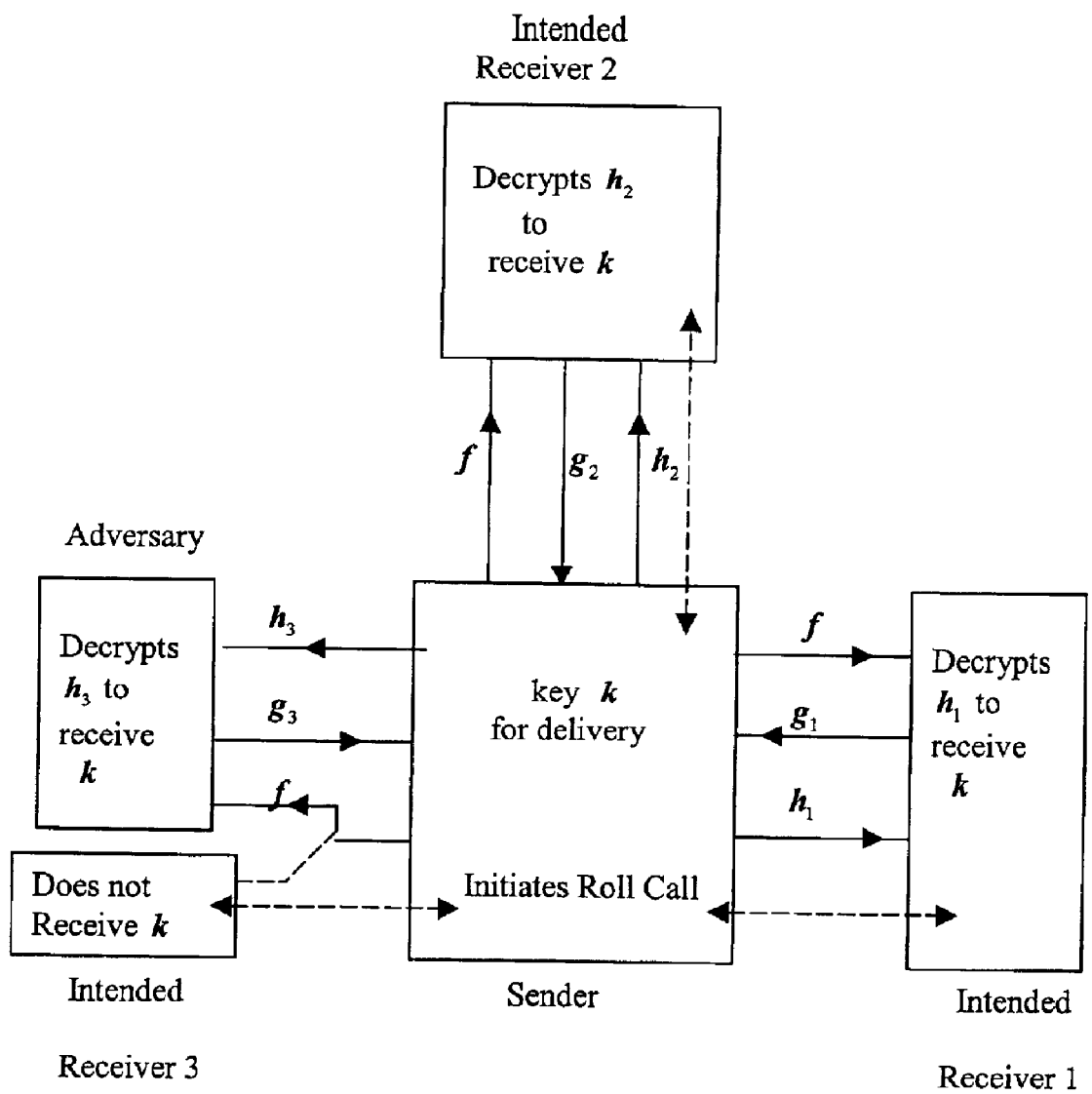
FIG. 5C is a block diagram of an attempted "man-in-the-middle" interception of a key during a method for secure key exchange between a single sender and multiple receivers being conducted in accordance with an embodiment of the present invention.

FIG. 5C shows a potential "man-in-the-middle" adversary situation for the multiple Intended Receiver scenario. As shown on the left of the figure, an Adversary has inserted itself in the place of the Intended Receiver 3, and conducts the same transactions with the Sender as Intended Receiver 3 was expected to do. There are different methods the Adversary could use to do this. It could copy "f" as it is being transmitted to the Intended Receiver 3; intercept "f" and re-propagate it to Intended Receiver 3; or, the Adversary could fully intercept "f" (i.e., hijack "f") and not provide any copy to Intended Receiver 3.

In this situation, the Sender uses different strategies to attempt to reduce the probability of an Adversary-compromised key exchange. First, the Sender needs to ensure that it receives the correct number of double-locked keys (i.e., "$g_1$," "$g_2$," "$g_3$") from the Intended Receivers. In the context of FIG. 5C, if the Sender receives less than all three, or more than three, it knows that it is possible an Adversary is involved in the transaction (e.g., the Adversary could have copied "f" and encrypted it, sending back a "$g_4$" double-locked key). If this is true, the Sender notifies all Intended Receivers of a potential adversary, and the key exchange is canceled. The key exchange can possibly be restarted using different encryption locks, but this may still leave the communications open to interception or copying by an Adversary. However, if the Adversary simply hijacks the communications directed to one Intended Receiver, the Sender may still get back the appropriate number of double-encrypted keys, and would not be able to detect the interception using this technique.

When the number of double-locked keys received equals the actual number of Intended Receivers, the sender utilizes another method to reduce the probability of a "man-in-the-middle" Adversary. After the secure key exchange is complete, the Sender initiates a "roll call," as shown in FIG. 5C. The roll call, utilizing a query encoded by the secret key exchanged using the method for secure key exchange described herein, requests a password acknowledgment from each of the Intended Receivers. A non-response from any of the Intended Receivers is a good indication that all of the communications to that Intended Receiver as part of the secure key exchange were hijacked, so all Intended Receivers are notified of the possibility of a potential adversary, and the key exchange is restarted. Again, passwords known only to the Intended Receivers, or answers to questions that can only be provided by the Intended Receivers, can be utilized to ensure that an Adversary is not simply masquerading as an Intended Receiver.

Turning next to a more detailed discussion of the functionality of aspects of the present invention, two particular cases will be described—a four-number encoding/encryption scheme, and a six-number encoding/encryption scheme. However, the present invention is not limited to any particular number encoding/encryption scheme, whether lesser or greater, and all such schemes are contemplated as part of the invention, affected only by the level of security needed and the allowable complexity of operations.

Figure 7:
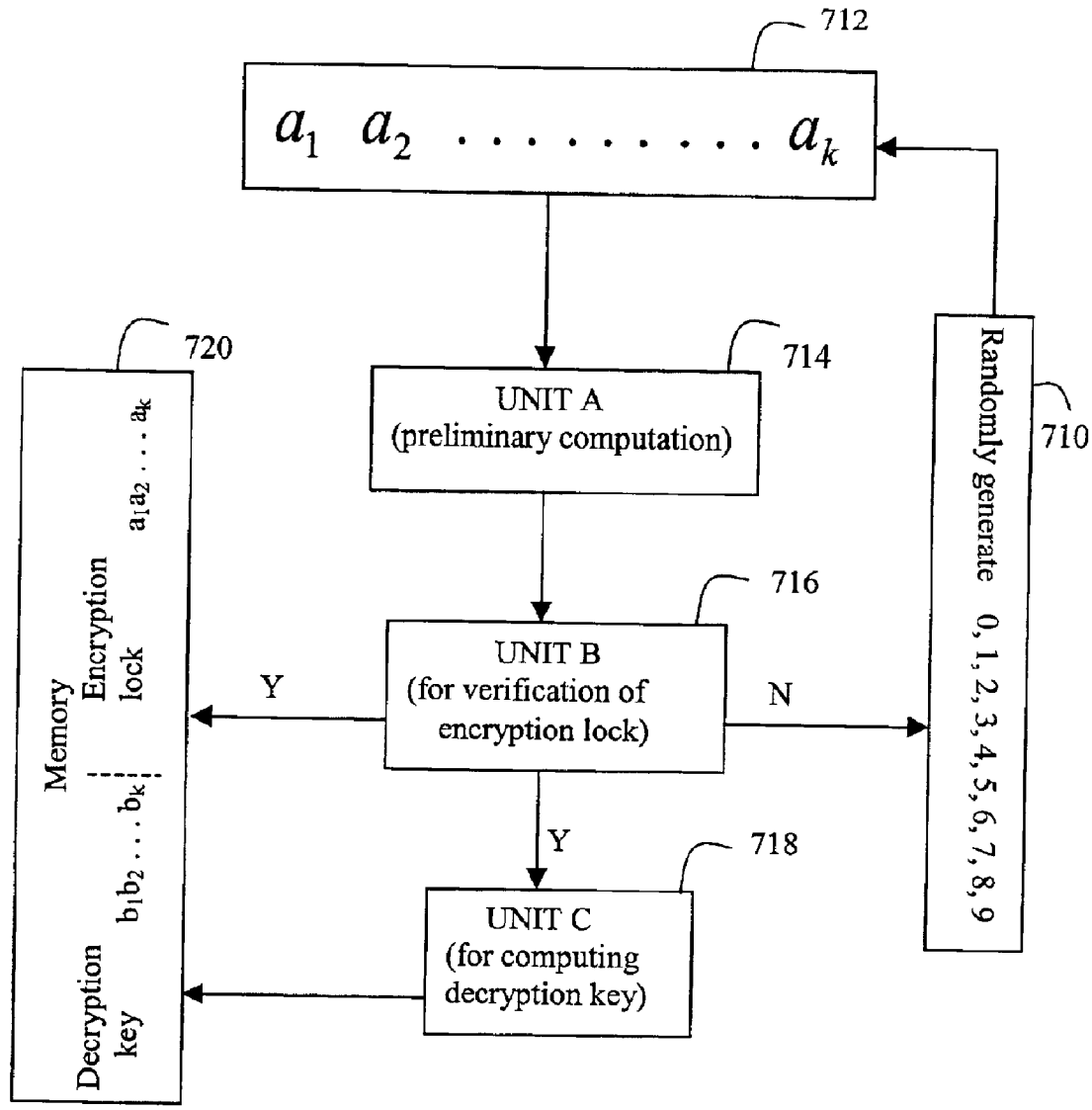
FIG. 7 is a logical block diagram of the process of generating lock-key pairs consistent with one embodiment of the present invention.

Referring to FIGS. 7 through 7F, the process of generating lock-key pairs is depicted for both the four-number scheme and the six-number scheme. Initially, the lock-key pair generator (1314, FIG. 13) requests a series of random numbers that are, in one embodiment, integers. These random numbers are generated by a random number generator, or are provided at random by a user of the device performing the communications (710). Alternatively, a user can input a random number seed that is utilized by the random number generator to generate a sequence of random numbers. The random numbers are shown as "$a_1\ a_2\ \ldots\ a_k$" (712). In this case, "k" is the desired of size of a lock and key in a lock-key pair. Thus, in one of the cases being described, "k" will be four, and in the other, "k" will be six. The random numbers "$a_1\ a_2\ \ldots\ a_k$" will be used to construct a "k"×"k" matrix for encryption, and will be used to calculate a set of numbers "$b_1\ b_2\ \ldots\ b_k$" that will be used to construct the inverse of the "k"×"k" matrix, for decryption.

Considering first the case with four-number locks and four-number keys, the random numbers "$a_1, a_2, a_3, a_4$" are used to construct a 4×4 matrix comprising a lock of a lock-key pair, as shown in FIG. 6A as 4×4 lock matrix 600. In the matrix, each consecutive row contains the "$a_1, a_2, a_3, a_4$" numbers, but they are shifted to the right by one, relative to the row immediately above. This matrix ensures that each integer of each encoded block is multiplied by each of the random numbers "$a_1, a_2, a_3, a_4$," as will be explained in further detail below.

The preliminary computations for 4×4 lock matrix 600, undertaken by Unit A, are shown in FIG. 7A (the "units" represent functional features of the lock-key pair generator). In particular, the equations for "$A_1$" and "$A_2$" determine whether 4×4 lock matrix 600 is invertible. They determine, in part, whether the determinant of the matrix is non-zero, a pre-requisite to determining whether a matrix is invertible. In addition to the two equations shown, other equations or algorithms that determine whether a matrix is invertible, as known to those of skill in the art, are contemplated to be within the scope of the invention.

Next, Unit B verifies, as shown in FIG. 7B, that the random numbers provided by the random number generator, or by the user, are actually invertible, based on whether "$A_1$" and "$A_2$" are non-zero. In addition to establishing that the determinant of 4×4 lock matrix 600 is non-zero "$A_1$" and "$A_2$" also form the denominator of some of the equations used to generate the keys, described below, and therefore cannot be zero for this reason additionally. If Unit B of the lock-key generator determines that "$A_1$" and "$A_2$" are non-zero, then random numbers "$a_1, a_2, a_3, a_4$" are stored in memory 720 as the lock of the lock-key pair being generated. Additionally, these random numbers, as well as "$A_1$" and "$A_2$," are provided to Unit C for key-generation.

If "$A_1$" and "$A_2$" do not meet the requirements (i.e., one or both are equal to zero), the lock-key pair generator requests that the random number generator, or the user, provide new random numbers to replace "$a_1, a_2, a_3, a_4$," sequentially and one at a time, until the requirements for "$A_1$" and "$A_2$" are met. Thus, "$a_1$" would be regenerated first, and the conditions for "$A_1\ and\ A_2$" retested. If this fails, "$a_2$" would be regenerated, and "$A_1$" and "$A_2$" retested, and so on. This procedure continues until four random numbers are provided that meet the requirements specified for "$A_1$" and "$A_2$," as shown in FIG. 7B.

Unit C of the lock-key generator, depicted in FIG. 7C, generates the corresponding key to a lock. The equations shown in FIG. 7C represent a linear algebraic approach to determining the inverse matrix to the 4×4 lock matrix 600. An inverse matrix of a matrix can be multiplied against the matrix to generate the identity matrix, or, in an encryption context, to decrypt data that has been encrypted, to generate the original pre-encrypted data. Stated mathematically, the product of a matrix A and its inverse $A^{-1}$ is 1, i.e., $A*A^{-1}=1$. An inverse matrix of a matrix can be calculated by multiplying the adjoint of the matrix times one over the determinant of the matrix. The equations depicted in FIG. 7C conduct these calculations, and thereby provide the values for the inverse matrix of the 4×4 lock matrix. The inverse matrix comprises a 4×4 matrix containing the numbers "$b_1, b_2, b_3, b_4$," shown as 4×4 key matrix 602 in FIG. 6A. Like with the structure of the 4×4 lock matrix 600, each consecutive row of the 4×4 key matrix 602 contains the "$b_1, b_2, b_3, b_4$" numbers, shifted over to the right by one relative to the row immediately above.

Figure 8A:
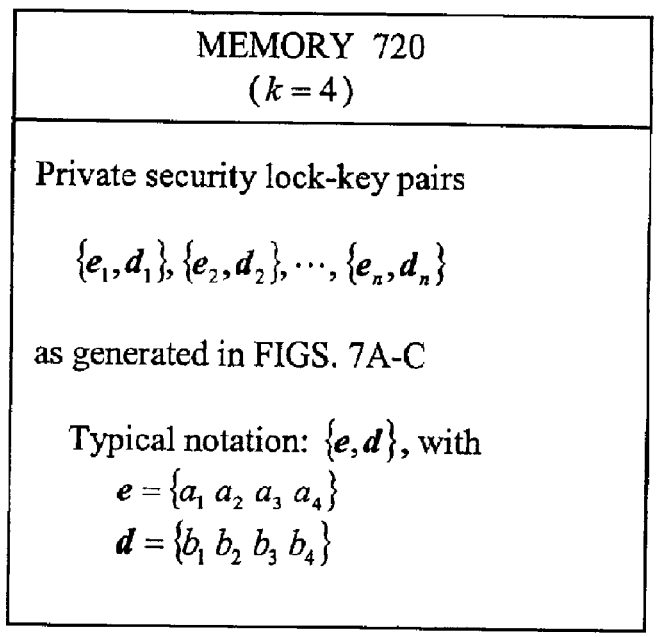
FIG. 8A shows an example of a memory containing four-number lock-key pairs generated by the processes of FIGS. 7A–C, in accordance with one embodiment of the present invention.

Once the lock-key pair generator determines both the 4×4 lock matrix 600, and the 4×4 key matrix 602, it has determined a lock-key pair. The actual lock and key need not be the full matrix, but rather are the four numbers that comprise each matrix. As shown in FIG. 7, the locks and keys are stored in memory 720, which is shown in more detail at FIG. 8A. The result is that each four-number lock-key pair, denoted as "$\{e_n, d_n\}$" in FIG. 8A, comprises a lock made up of random numbers "$a_1, a_2, a_3, a_4$," and a key made up of numbers "$b_1, b_2, b_3, b_4$" that correlate to an inverse matrix to the lock matrix.

FIGS. 7D through 7E show the determinations for Units A through C, respectively, for six-number locks and keys (as opposed to the four-number locks and keys just discussed). Thus, instead of four random numbers "$a_1, a_2, a_3, a_4$" (i.e., "k"=4), this case uses six random numbers "$a_1, a_2, a_3, a_4, a_5, a_6$" (i.e., "k"=6). Like with the four-number case, the six random numbers "$a_1, a_2, a_3, a_4, a_5, a_6$" are turned into a 6×6 lock matrix 610, as shown in FIG. 6B, with each row of the random numbers shifted over to the right by one, relative to the row immediately above.

The equations used for the preliminary calculations of Unit A, shown in FIG. 7D, like the preliminary calculations shown in FIG. 7A for the four-number case, are used to determine whether the 6×6 lock matrix 610 is invertible. There are more equations than the four-number case due to the greater size, and hence greater complexity, of the 6×6 lock matrix. However, the general premise is the same—analyzing, in part, whether the determinant is non-zero. Thus, Unit B tests whether certain relationships exist between the random numbers of the 6×6 matrix, as shown in FIG. 7E. If any one of the three conditions specified in FIG. 7E fails, the lock-key pair generator requests that the random number generator, or the user, provide new random numbers to replace "$a_1, a_2, a_3, a_4, a_5, a_6$," one at a time and in that order, until all of the conditions specified in FIG. 7E are met. When the three conditions are met, then random numbers "$a_1, a_2, a_3, a_4, a_5, a_6$," are stored in memory 720 as the lock of the lock-key pair being generated. Additionally, these random numbers, as well as the variables used in the preliminary computations, are provided to Unit C for key-generation.

Unit C of the lock-key generator, depicted in FIG. 7F for six-number keys, generates the corresponding key to a lock. Like with the equations for the 4×4 lock matrix 600, the equations shown in FIG. 7F determine the inverse matrix to the 6×6 lock matrix 610. The inverse matrix is the 6×6 key matrix 612 containing the numbers "$b_1, b_2, b_3, b_4, b_5, b_6$," as shown in FIG. 6B. Like the structure of the 6×6 lock matrix 610, each consecutive row of the 6×6 key matrix 612 contains the "$b_1, b_2, b_3, b_4, b_5, b_6$" numbers, shifted over to the right by one, relative to the row immediately above.

Figure 8B:
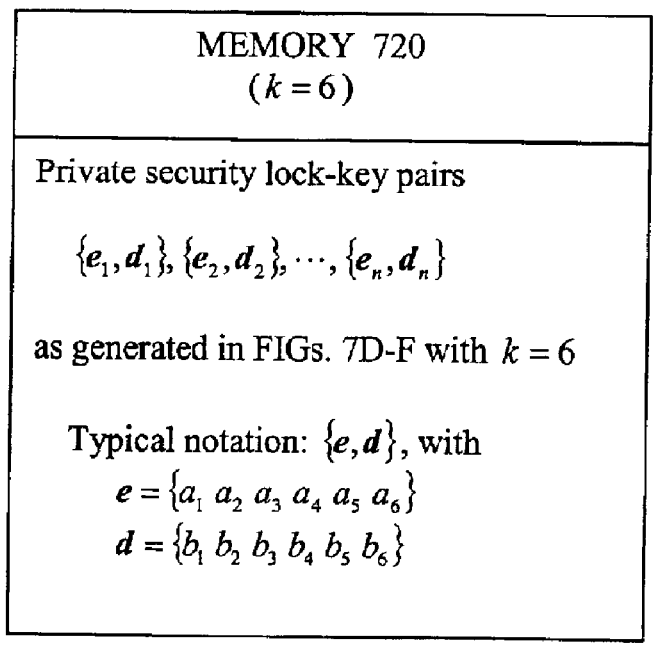
FIG. 8B shows an example of a memory containing six-number lock-key pairs generated by the processes of FIGS. 7D–F, in accordance with another embodiment of the present invention.

If 6×6 key matrix 612 is multiplied times 6×6 lock matrix 610, the result is the identity matrix. Therefore, the 6×6 key matrix 612 will decrypt encryption applied by the 6×6 lock matrix 610. The generation of 6×6 key matrix 612 completes the generation of a lock-key pair for the six-number case. The lock-key pair "$\{e_n, d_n\}$" is stored in memory 720, which is shown in more detail for the six-number case at FIG. 8B. As shown in FIG. 8B, the lock "$e_n$" comprises the random numbers "$a_1, a_2, a_3, a_4, a_5, a_6$," and the key "$d_n$" comprises the numbers that correlate to an inverse 6×6 matrix to the lock—"$b_1, b_2, b_3, b_4, b_5, b_6$."

As previously discussed, the generation of the lock-key pairs does not need to occur at the same time the secure communications of the present invention are initiated. Rather, the lock-key pairs are typically generated when, for example, the functionality of the present invention is first activated in a device. This may occur, for example, when a device is first powered on. Also, greater security is achieved by periodically generating new lock-key pairs. This could occur as often as every communication in one embodiment, but in other embodiments, occurs at more periodic intervals, whether regularly scheduled or event-driven. For example, in one embodiment, new lock-key pairs are generated when the batteries are recharging in a portable electronic device. Thus, when a cell phone is connected to a power source for recharging, the random number generator can generate new random numbers until the criteria described above are met, or the cell phone can prompt a user to key-in a new set of random numbers until the criteria are met.

In some cases, two computers or devices may wish to engage in communications, but only one of the computers or devices has the functionality of the present invention. In one embodiment, the functionality of the present invention is a computer program capable of performing a portion, or all, of the features of the method of secure data communications. One party to a communication can send the computer program, which may be a Java applet in one embodiment, to the other party or parties. For example, a sender who wished to send a data message or a secret key or a code table to a recipient who did not have compatible software could transmit a program to the recipient capable of performing the encrypting of the sender-encrypted secret key, and the decrypting of the receiver-encrypted secret key, at the receiver. Or, a party who wished to receive a data message or secret key securely, but for which the sender did not have the capabilities of the present invention, could send that sender a program capable of performing the encrypting of the secret key, and the decrypting of the receiver- and sender-encrypted secret key, at the sender.

Turning to FIG. 9A, a code table for encoding data or a secret key before it is encrypted for transmission, for the case of a four-number lock, is shown, in accordance with one embodiment of the present invention. This may be particularly useful if the data being transmitted is particularly sensitive, such as a secret key. Encoding the secret key provides another layer of security, premised on an entirely different security mechanism than the encryption process, requiring an adversary to obtain, decrypt, and decode a communication to obtain its contents.

Before the coding scheme set forth in the coding table can be applied, the secret key to be transmitted must be partitioned into blocks of numbers (integers in one embodiment), up to four integers long for the example being described. The partitioning is based on the similarity of adjacent numbers, as shown in FIG. 9B by partitioned blocks 900. Before being encoded, the secret key will typically be a long sequence of non-negative integers. Starting at the first integer, a partition is made after the second integer if it is different than the first; after the third integer if the first and second are the same, but the third is different; or, otherwise, after the fourth (in which case the first three integers are the same, with the fourth being either the same or different). Once the end of the sequence is reached, there will be between one and four integers remaining, and no additional partition is required.

At this point, the secret data is broken up into one- to four-integer blocks. Now, the coding scheme set forth in FIG. 9A is applied to the partitioned blocks. For example, using the code table, "a b" is translated to "a b a b." This means that if a block is two distinct integers long, such as "4 5," the first integer is repeated twice, and the second integer is repeated twice, resulting in "4 4 5 5." In this way, the two-integer block is converted into a four-integer encoded block. Thus, regardless of whether a pre-encoded integer block is one or four integers long, after encoding, all of the encoded blocks are four integers long. This ensures that each encoded block can be "locked" by a 4×4 lock matrix 600 through a matrix multiply. (To multiply two matrices together, the length of the first matrix's rows must be equal to the depth of the second matrix's columns).

In the instances where a partitioned block has all of the exact same integer, the coding scheme requires that the integer and a negative number be alternated (e.g., "a a a" translates to "a –3 a –3."). Thus, based on the coding table, for a partitioned block such as "2 2 2 2," the corresponding encoded block would be "2 –4 2 –4." The encoding continues for all of the partitioned blocks of the secret key until all values have been converted into four-integer encoded blocks. In FIG. 9B, the partitioned blocks 900 of the secret key are shown converted into encoded blocks 902, consistent with this scheme.

The pre-coding partitioning scheme for six-number locks is shown in FIG. 10A, in accordance with one embodiment of the present invention. The data or secret key integer sequence is partitioned into five-integer blocks, irrespective of the value of the integers. According to the first rule of the partitioning scheme, if all five of the integers are the same, the last two integers are translated to –1 –1 (i.e., "a a a a a" becomes "a a a –1 –1"). The second rule applies to the end-sequence partitioned block, and provides a methodology to convert a block of less than five integers to a five-integer block.

Once the partitioning methodology has been implemented, as shown by partitioned blocks 1000 in FIG. 10C, the coding of the code table shown in FIG. 10B is applied. In this particular coding scheme, the five integers are left unchanged, and a sixth integer is added that is equal to "$x_1-x_2+x_3-x_4+x_5$." The result of applying this encoding scheme to partitioned blocks 1000 is shown as encoded blocks 1002 in FIG. 10C.

While two embodiments of coding schemes for the four-number ("k"=4) and six-number ("k"=6) schemes have been described, the present invention is not meant to be limited to any particular type of coding scheme. Any coding scheme known by those of skill in the art is expressly meant to be encompassed by the present invention. Longer encoding schemes are generally more secure than shorter ones. The varieties of coding schemes are virtually unlimited, and any scheme that provides added security while ensuring uniformity of encoded block length will be useful in the present invention. To ensure that a coding scheme can be used to mutually code and decode data, the partitioning and coding/decoding schemes should be known by both parties in advance, although, in one embodiment, the coding scheme can be included with the data message securely communicated using the methodology of the present invention. In this case, it is beneficial to base the coding scheme on information that is known to, or can only be known by, the intended receiver.

Turning now to the encryption, decryption, and transmission processes, FIGS. 11A–11D depict this functionality for the four-number lock-key pair case. The encryption process shown in FIG. 11A occurs at the sender of, for example, a secret key. Memory 1100 stores the sets of lock-key pairs, pre-generated in accordance with the methods described above. The encoded block "c" 1106 is a four-integer encoded block of the secret key, represented as "$c_1$, $c_2$, $c_3$, $c_4$." The encoding is applied as described previously. Encoded block 1106 is encrypted in this process on a block-by-block basis, whether done serially or in parallel. It is stored locally for fast processing, preferably in a register.

To begin the encryption process for encoded block 1106, a lock-key pair "$e_s$, $d_s$" is selected from memory 1100. In a preferred embodiment, a different lock-key pair is selected for each encoded block 1106 being encrypted. The order of selection of the lock-key pairs can be sequential, because the lock-key pairs themselves were chosen randomly, or can be chosen at complete random, thereby adding another level of security. This would be useful in the unlikely event that an adversary somehow obtains the sender's generated lock-key pairs. Using a lock-key pair to encrypt and decrypt more than one encoded block (and in particular a sequence of encoded blocks) can compromise the security of the system, because it would given an attacker or eavesdropper an opportunity to mathematically derive candidates for the lock-key pair. However, if reuse of a lock-key pairs is randomized, meaning that the pattern of re-use of lock-key pairs is sufficiently random to be effectively unpredictable, then the reduction in security associated with such re-use may be acceptable.

Next, the key "$d_s$" of the selected lock-key pair "$e_s$, $d_s$" is stored in cache 1102. In other embodiments, a representation of the key (as opposed to the key itself) is stored in the cache 1102. Or, both the lock and key, or representations of them, can be stored in the cache (it is unnecessary to store the lock, however, because it is not reused). Alternatively, the selected key "$d_s$" can be stored in a portion of memory 1100 that is not cache memory. In any event, the selected lock "$e_s$" 1104, also known as a first lock, is read out of memory 1100 and, in one embodiment, stored locally in a register.

To perform the actual encryption, an encryption module 1108 performs a matrix multiply between a 4×4 lock matrix 600, and encoded block 1106. The structure of the 4×4 lock matrix 600 has been described previously, with the rows of the matrix comprising the lock 1104 numbers "$a_1$, $a_2$, $a_3$, $a_4$," with each row being shifted to the right once relative to the row above it. In one embodiment, this matrix structure is established through the use of shift registers. The shift registers work in conjunction with a FIR filter that conducts the matrix multiply. In other embodiments, the matrix structure and multiply functions are implemented in software. Any other means of conducting this functionality, well-established in the art, are also within the scope of the invention.

The result of the matrix multiplication is the encrypted codeword "h" 1110. The sender-encrypted codeword 1110 contains four integers "$h_1$, $h_2$, $h_3$, $h_4$," as shown in the encryption module 1108. (These values will necessarily be integers, in the embodiment being described, because the encoded block 1106 is comprised of integers, as is the random-number integer lock 1104). As shown in the encryption module 1108, after the matrix multiply, each integer "$h_1$, $h_2$, $h_3$, $h_4$" of the encrypted codeword 1110 is the sum of a multiplication between each integer of the encoded block 1106, and each integer of the lock 1104, in various pairings. By using 4×4 lock matrix 600, comprised of the lock 1104 integers, instead of just the lock 1104 integers directly, the encryption module 1108 achieves a greater magnitude of mathematical complexity in encrypting the encoded block 1106. This encryption process is repeated for each encoded block 1106 in the secret key, until all encoded blocks have been encrypted. The resulting series of encrypted codewords 1110 comprise the sender-encrypted secret key, also referred to as a locked data message.

For transmission purposes, the sender-encrypted codeword 1110 is treated as a plaintext message to be sent to the intended receiver. Each sender-encrypted codeword 1110 can be transmitted to the intended receiver as it is encrypted (if encrypted serially), or the entire secret key can be transmitted at once, after all of the encoded blocks have been encrypted. While shown as a serial process, the encryption process in FIG. 11A can also occur in parallel, with the entire secret key being encrypted simultaneously. Further, while specific examples of encryption algorithms involving square matrices have been described as embodiments of the present invention, other encryption schemes, including other types and sizes of matrices, are also contemplated to be within the scope of the invention. Specifically, any encryption scheme (including non-matrix functions) that has an inverse function, such that data encrypted with the scheme can also be decrypted by the inverse of the function, will work with the present invention. The only requirements are that the encryption scheme must be decryptable, and in particular commutatively decryptable, which will be discussed below.

Figure 11A:
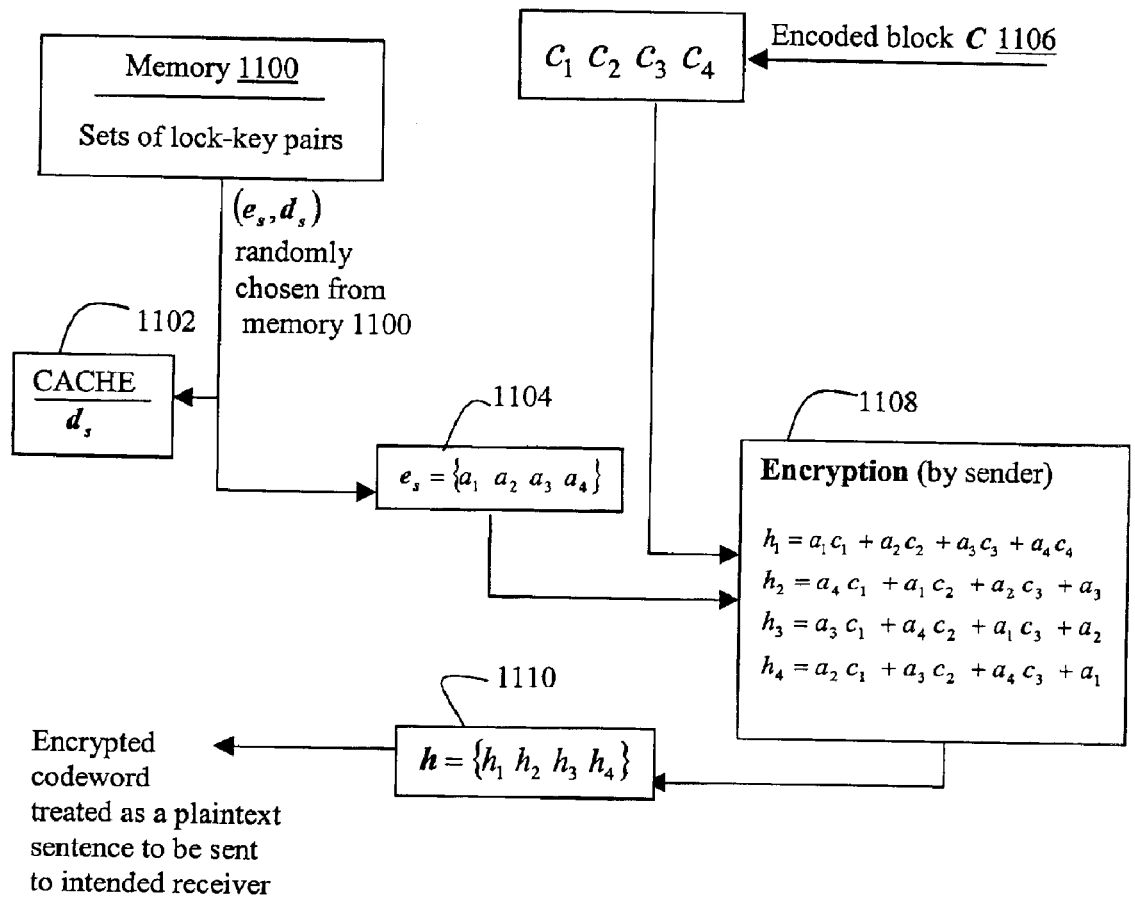
FIG. 11A is a logical block diagram showing a method of encrypting a secret key using locks from four-number lock-key pairs, at a sender, in accordance with one embodiment of the present invention.
Figure 11B:
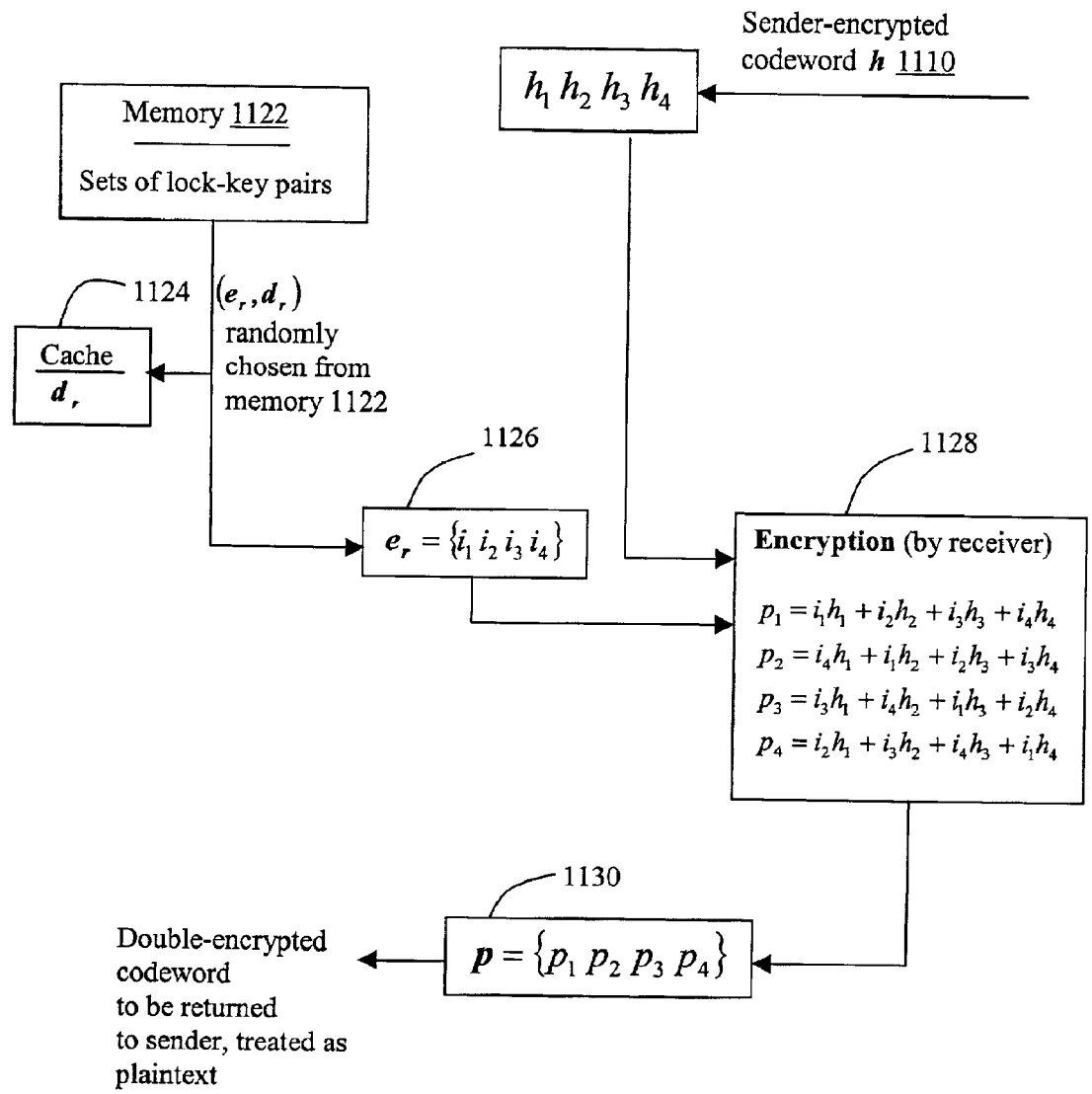
FIG. 11B is a logical block diagram showing a method of double-encrypting a sender-encrypted secret key using locks from four-number lock-key pairs, at a receiver, consistent with an embodiment of the present invention.

Referring to FIG. 11B, the double-encrypting process at the intended receiver is shown. The receiver first receives the sender-encrypted codeword 1110, preferably storing it in a register. (In actuality, the receiver receives a series of sender-encrypted codewords constituting the sender-encrypted secret key, or locked data message.) Prior to receipt of the codeword, the receiver pre-generates sets of lock-key pairs, stored in memory 1122, in accordance with the lock-key pair generation methods discussed above. Then, to double-encrypt the sender-encrypted codeword 1110, a lock-key pair "$e_r$, $d_r$" is first selected from memory 1122. (A different lock-key pair is preferably selected for each sender-encrypted codeword 1110 being double-encrypted). As before, the lock-key pair selection is random, although it can also be sequential or in any other predetermined order. The key "$d_r$," or a representation of it, is stored in cache 1124. The selected lock "$e_r$" 1126, also known as a second lock, is also stored in a register in one embodiment.

To perform the encryption, an encryption module 1128 performs a matrix multiply between 4×4 lock matrix 600, and sender-encrypted codeword 1120. The 4×4 lock matrix 600 is based on the random number integers "$i_1$, $i_2$, $i_3$, $i_4$," paralleling the structure of the 4×4 lock matrix 600 used by the sender to initially encrypt the secret key. Again, using shift registers and a FIR filter, or software, the encryption module 1128 performs the matrix multiply, producing double-encrypted codeword "p" 1130. As before, the use of the 4×4 lock matrix 600 ensures that each integer of the double-encrypted code word "$p_1, p_2, p_3, p_4$" is the sum of a multiplication between each already-encrypted integer of sender-encrypted codeword 1120, and each integer of lock 1126, mathematically increasing the complexity of the encryption. This double-encryption process is repeated for each sender-encrypted codeword 1120 in the secret key, until all encoded blocks have been encrypted.

The resulting series of double-encrypted codewords 1130 comprise the receiver- and sender-encrypted secret key, also referred to as a double-locked data message. The double-encrypted codewords are transmitted, either individually as they are double-encrypted, or collectively when the entire secret key has been double-encrypted, back to the sender, treated again as plaintext.

Figure 11C:
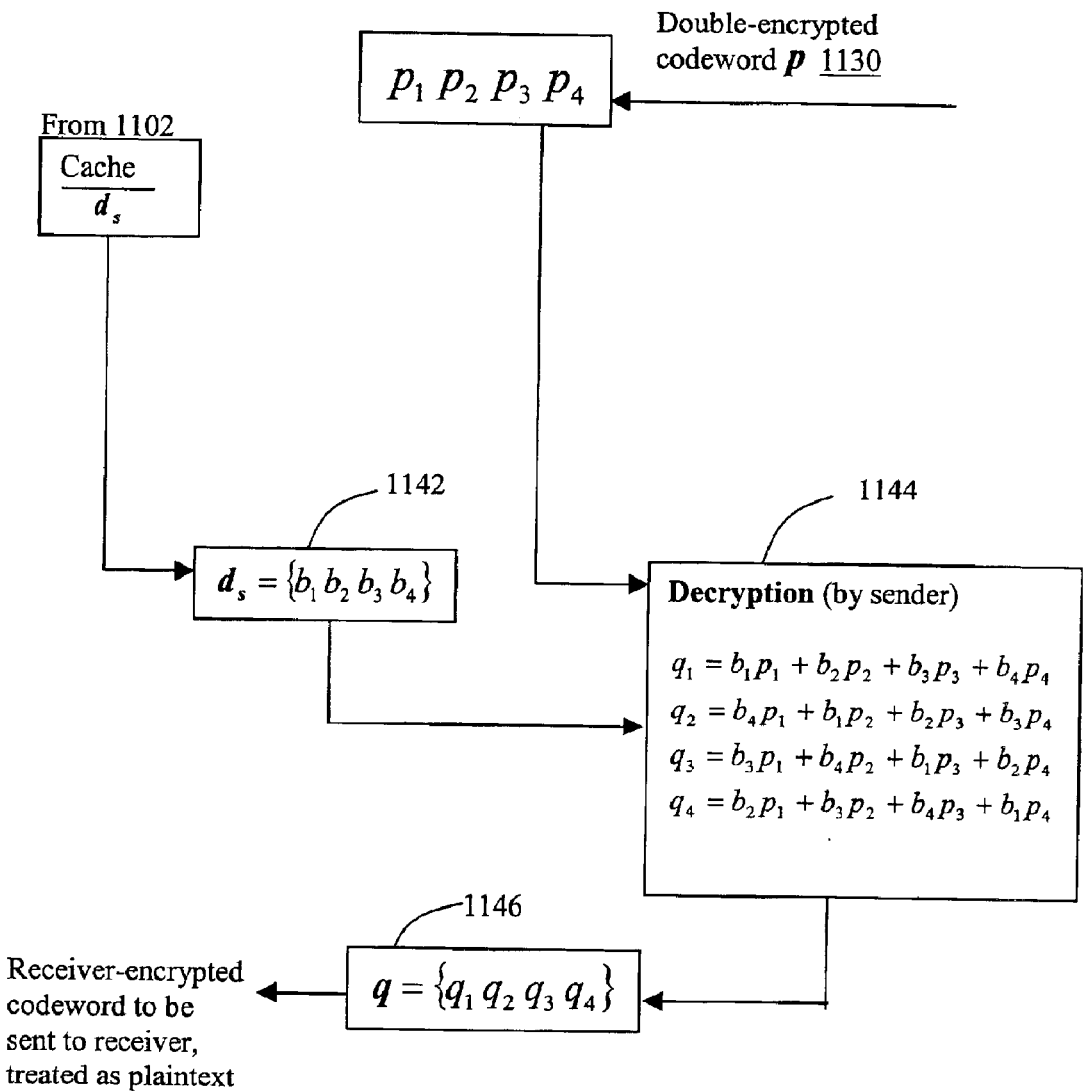
FIG. 11C is a logical block diagram showing a method of commutatively decrypting a double-encrypted secret key using keys from four-number lock-key pairs, at the sender, in accordance with an embodiment of the present invention.

Referring to FIG. 11C, the process of decrypting the sender-encryption of the double-encrypted codeword "p" 1140, at the sender, is shown. The double-encrypted codeword 1130 arrives back at the sender and is stored in a register, buffer or other memory structure or device. Meanwhile, the key "$d_s$" is retrieved from cache 1102, where it was previously stored as shown in FIG. 11A. Alternatively, a representation or pointer to "$d_s$" may be stored in cache 1102, which is retrieved and used to load the actual key "$d_s$" from memory. The retrieved key "$d_s$" 1142 (also known as a first key), comprising numbers "$b_1, b_2, b_3, b_4$" used to form an inverse 4×4 key matrix 602, is loaded into a register.

Next, using a FIR filter and shift registers in one embodiment, or software in another, decryption module 1144 conducts the same matrix multiply undertaken for the encryption functionality of FIGS. 11A and 11B to decrypt the double-encoded codeword "p" 1130 to generate a receiver-encrypted-only codeword "q" 1146. However, because the key "$d_s$" 1142 was specifically designed to be able to form an inverse to the lock "$e_s$," conducting this matrix multiply results in a multiplication between the sender 4×4 lock matrix 600, and the sender 4×4 key matrix 602, for a net value of one. This effectively removes the sender-encryption of the double-encrypted codeword 1130.

When all of the double-encrypted codewords 1130 of the secret key are decrypted in this fashion by the sender, this effectively removes the sender-encrypted portion of the receiver- and sender-encrypted secret key, or unlocks the first lock of the double-locked data message. The now receiver-encrypted-only codewords are transmitted, either individually as they are decrypted in this fashion, or collectively when the entire key has been decrypted in this fashion, back to the receiver. The receiver-encrypted codewords are treated as plaintext.

One important feature of the present invention, demonstrated in FIG. 11C, is the ability to perform commutative decryption. The commutative property holds that the order of the operands in certain mathematical equations can be reversed without affecting the result, such as with matrix multiplication. In a sense, this allows the first "layer" of encryption, originally applied by the sender, to be decrypted "behind" the second "layer" of encryption, applied by the receiver. In a visual analogy, it is as if a secret box is encrypted with a protective shield, and then double-encrypted with a second protective shield external to the first shield, and the invention allows the first protective shield to be unlocked "through" the second protective shield. This enables both the sender and the receiver to encrypt the secret data to be transmitted, and the sender to unlock its own encryption regardless of the fact that it was applied first, leaving the secret data only receiver-encrypted. Because the secret data is receiver-encrypted only, it easily can be decrypted by the receiver to reveal the original secret data. During the transmission process back and forth under this scheme, the secret data is never transmitted without at least one layer of encryption applied.

Figure 11D:
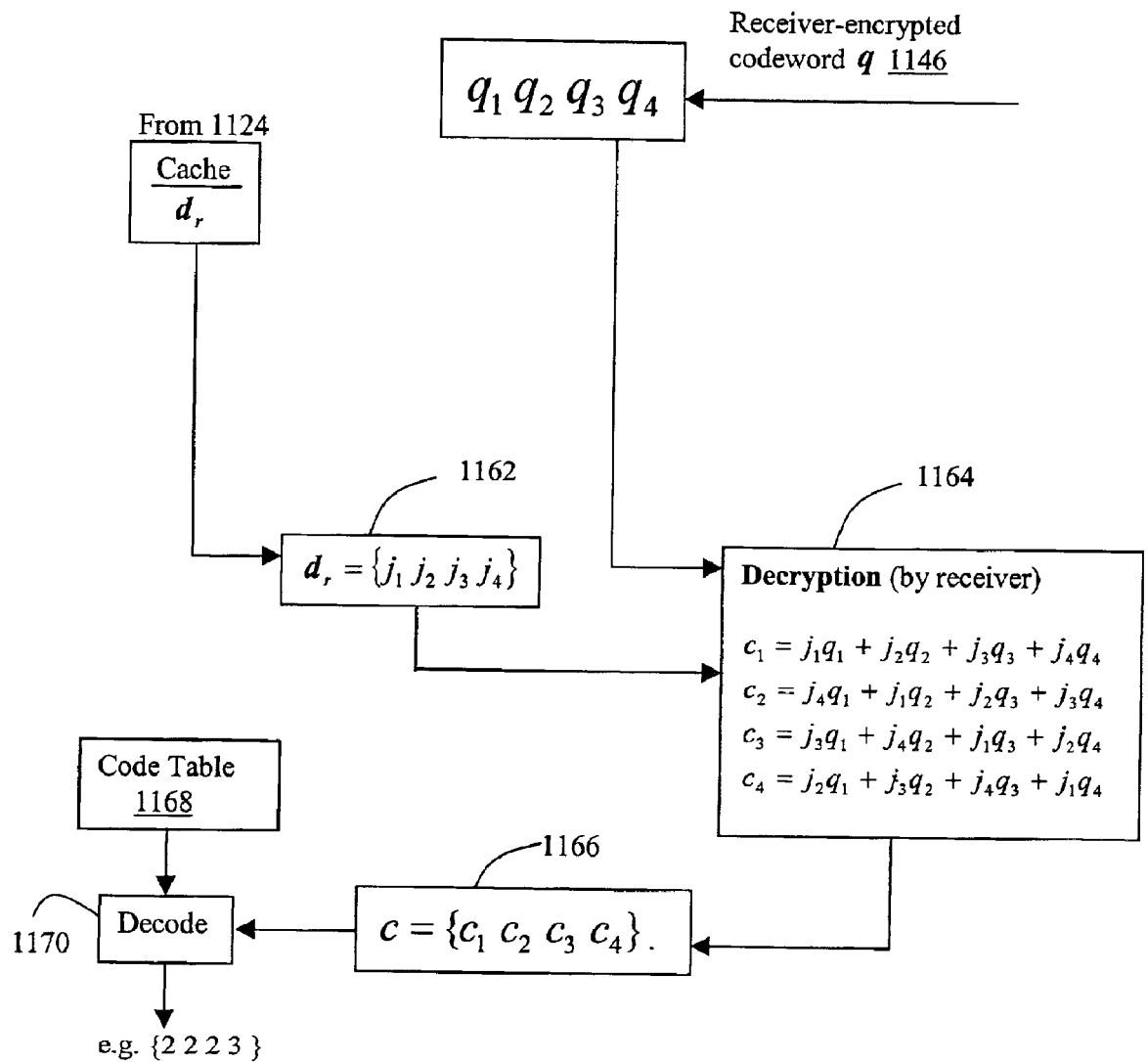
FIG. 11D is a logical block diagram showing a method of decrypting a receiver-encrypted secret key using keys from four-number lock-key pairs, at the receiver, consistent with an embodiment of the present invention.
Figure 11E:
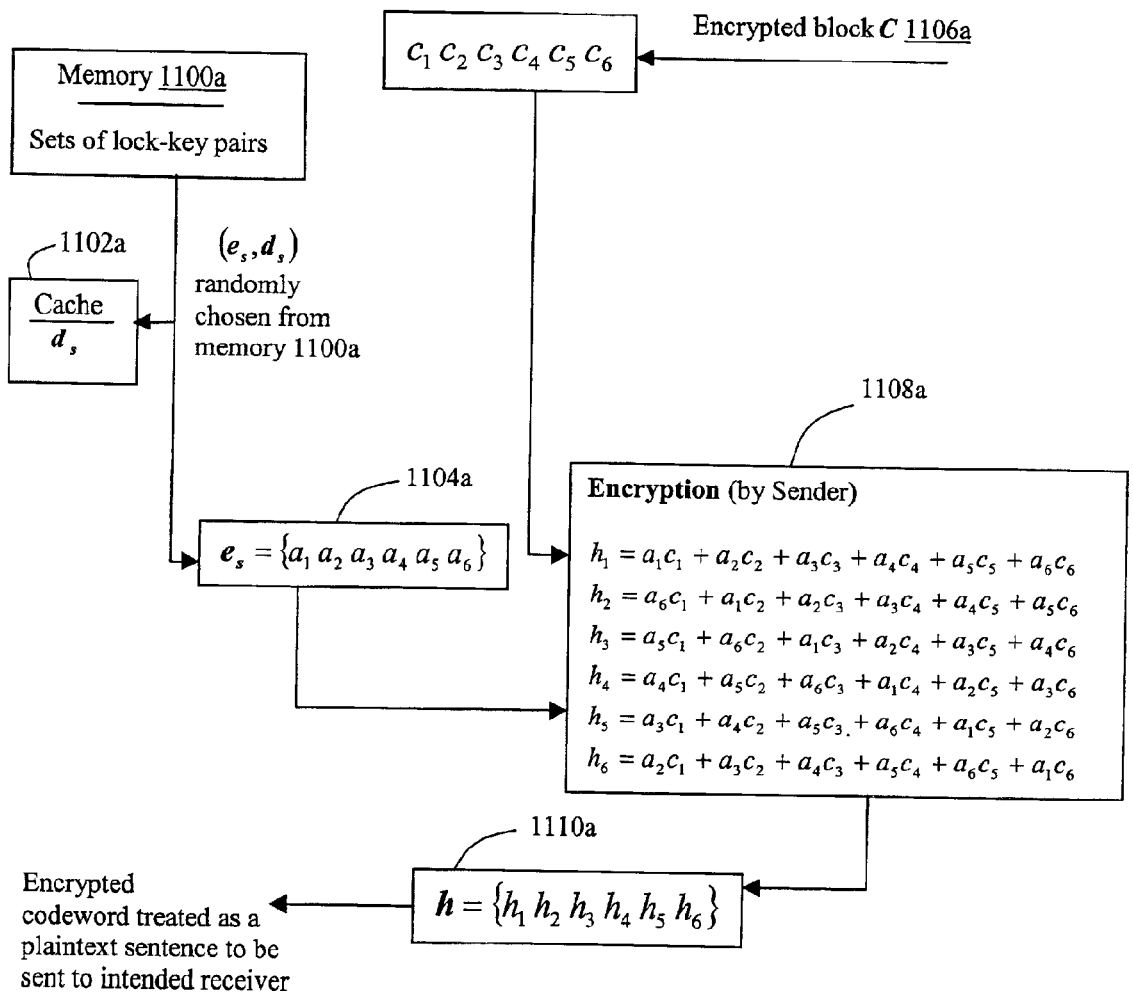
FIG. 11E is a logical block diagram analogous to FIG. 11A, but using six-number lock-key pairs instead.
Figure 11F:
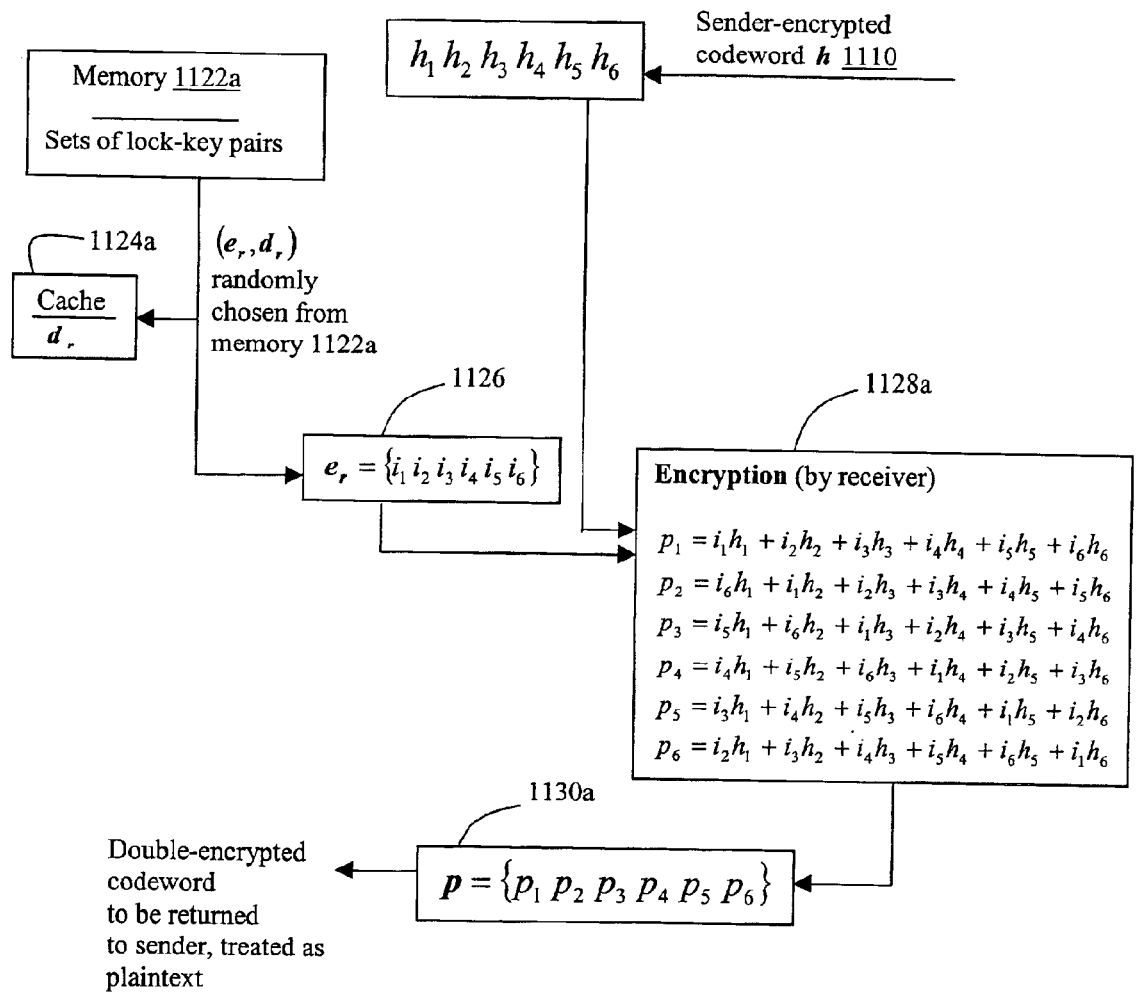
FIG. 11F is a logical block diagram analogous to FIG. 11B, but using six-number lock-key pairs instead.
Figure 11G:
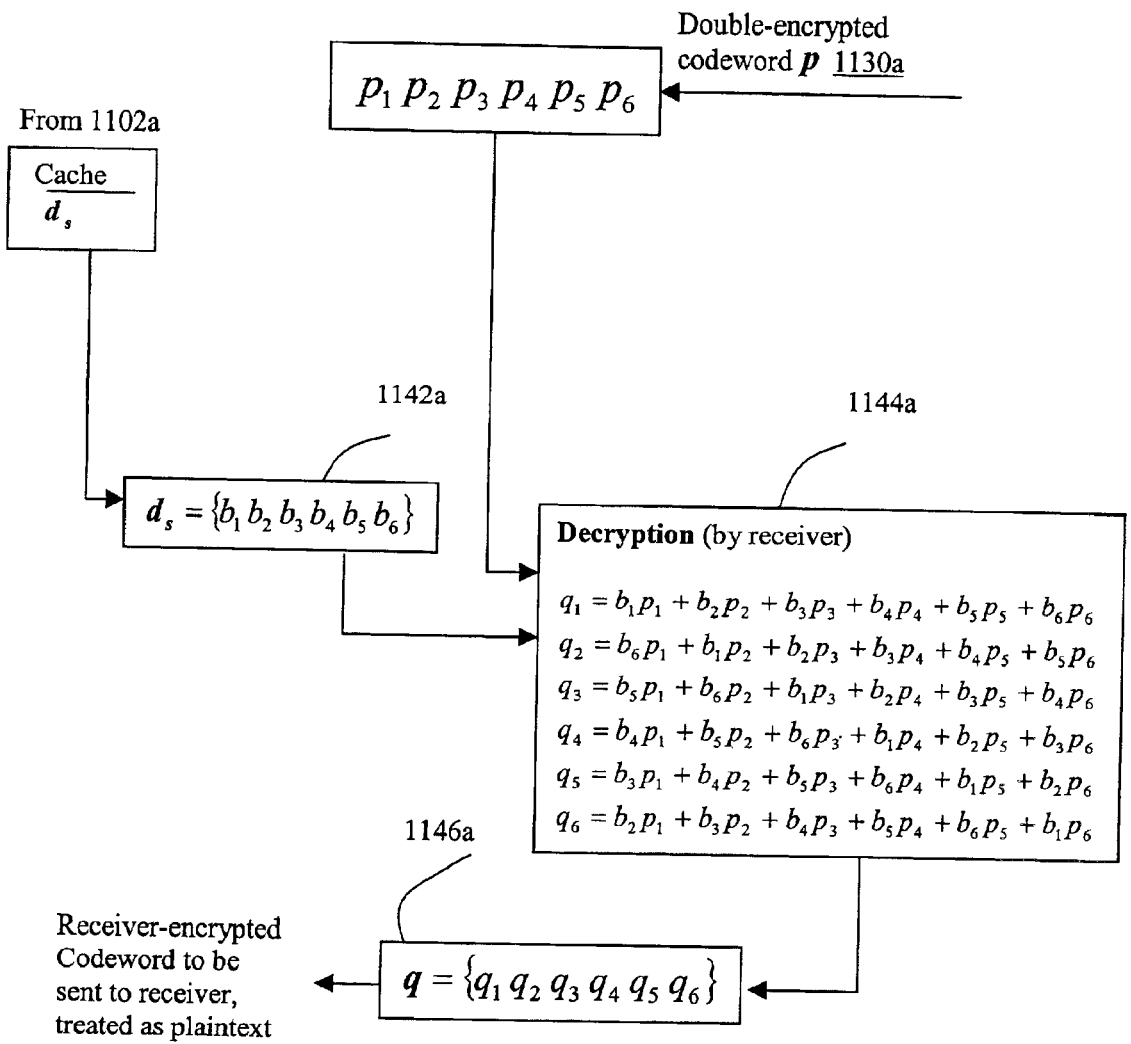
FIG. 11G is a logical block diagram analogous to FIG. 11C, but using six-number lock-key pairs instead.
Figure 11H:
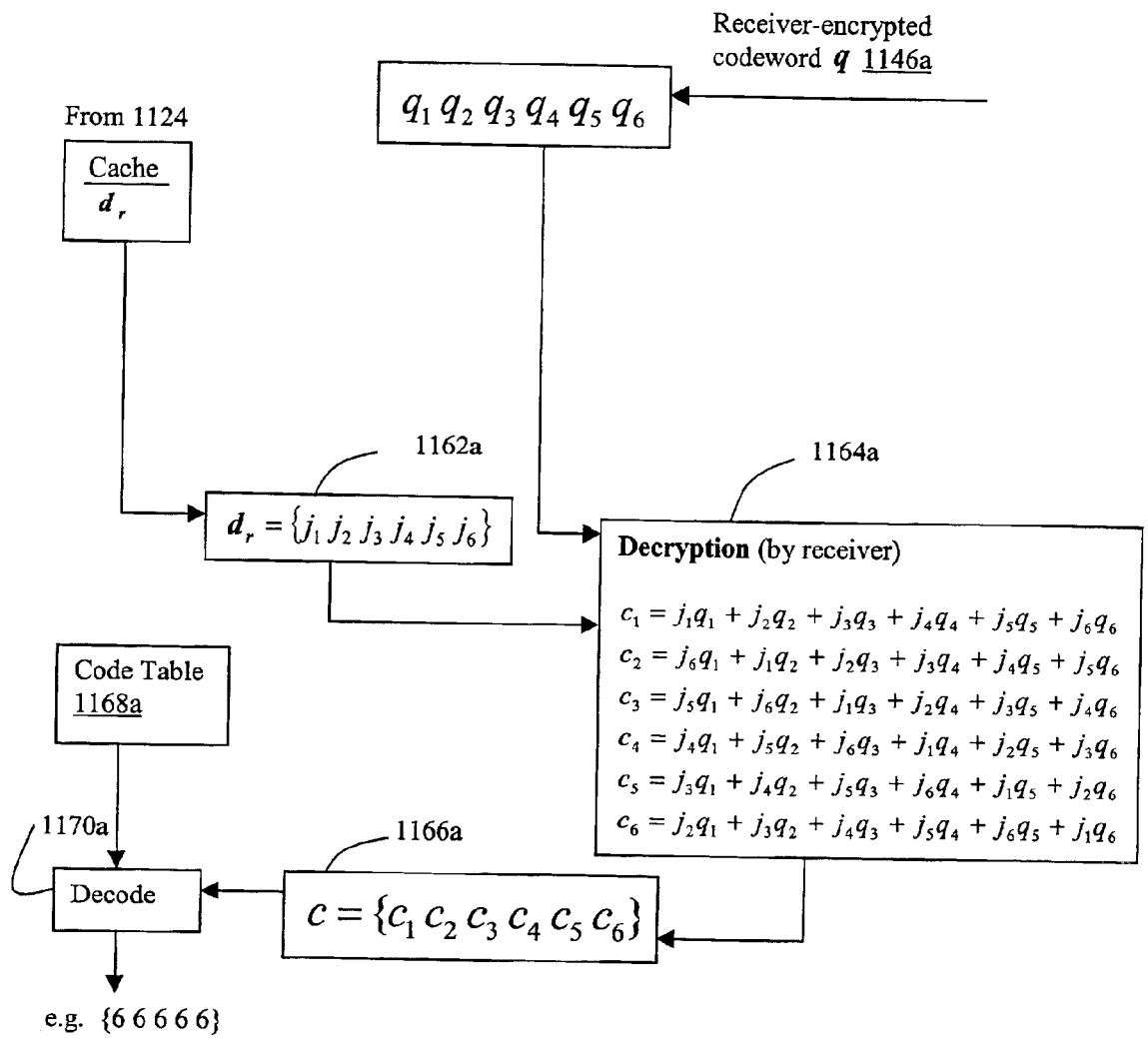
FIG. 11H is a logical block diagram analogous to FIG. 11D, but using six-number lock-key pairs instead.

Completing the transmission, the functionality for decrypting the receiver-encryption, at the receiver, is shown in FIG. 11D. The receiver-encrypted codeword "q" 1146 arrives back at the receiver, where it is stored in a register in one embodiment. The key "$d_r$" is retrieved from cache 1124, where it was previously stored as shown in FIG. 11B. Alternatively, a representation or pointer to "$d_r$" may also be stored in the cache, which is retrieved and used to load the actual key "$d_r$" from memory. The retrieved key "$d_r$" 1162 (also known as a second key), comprising numbers "$j_1, j_2, j_3, j_4$" that are used to form inverse 4×4 key matrix 602, is loaded into a register. Then, using a FIR filter and shift registers in one embodiment, or software in another, decryption module 1164 conducts the same matrix multiply decryption as described in FIG. 11C. In this case, multiplying the 4×4 lock matrix 600 for "$e_r$" against the 4×4 key matrix 602 for "$d_r$" results in a net value of one, effectively decrypting the receiver encryption of the receiver-encrypted codeword 1146, or unlocking the second lock. The result is the regeneration of the original encoded block "c" 1166.

Finally, the original encoded block "c" 1166 is decoded by decoder 1170, using decode table 1168, which is the reverse of the code table depicted in FIG. 9A. After the decoder decodes each integer "$c_1, c_2, c_3, c_4$" of the encoded block 1166, the original partitioned code block is left. As explained above in the context of the encoding process, not every partitioned block is actually four integers in length—instead, some partitioned blocks had been converted into four integers to allow for an uniform encryption and decryption process. Therefore, after being decrypted, the partitioned blocks are reset to their original length. As the final step, the blocks are concatenated (or otherwise reassembled in a particular order), with the final result being the actual secret key or secret data message. The secure communications of a secret key is complete, without requiring an exchange of a public key. If the data message is a digital signature, the decoded digital signature proves, in theory, that the sender (as a party in possession of the secret decoding scheme) is who it purports to be.

FIGS. 11E–H detail the same sequence as described for FIGS. 11A–D, but for the six-number lock-key pair case. For convenience, the exact same numbers used for the processes of FIGS. 11A–D are depicted, but with the suffix "a." Besides the fact that each encrypted block "c" 1106a is six integers long, and that the lock-key pairs ("$e_s, d_s$"; "$e_r, d_r$") are six numbers long each for the lock and for the key, the processes are the same. In particular, referring to FIG. 11E, the encryption module 1108a multiplies six-integer encrypted block "c" 1106a against six-integer lock "$e_s$" to generate encrypted codeword "h," which has six values (in this case, integers) "$_1, h_2, h_3, h_4, h_5, h_6$." Like with the results of the matrix multiplications for the four-integer case, each number "$h_1, h_2, h_3, h_4, h_5, h_6$" is the sum of a multiplication between each integer of the encoded block 1106a, and each integer of the lock 1104a, in various pairings.

The process continues as explained in the context of the four-number case, discussed above, with only the differences stated. At the end of the process, shown in 11H, each original encoded block "c" 1166a is decoded by decoder 1170a, using code table 1168a, to produce the original partitioned code blocks. Finally, the blocks are concatenated (or otherwise reassembled in a particular order), with the final result being the actual secret key or secret data message. If the data message is a digital signature, the decoded digital signature proves, in theory, that the sender (as a party in possession of the secret decoding scheme) is who it purports to be.

Figure 12:
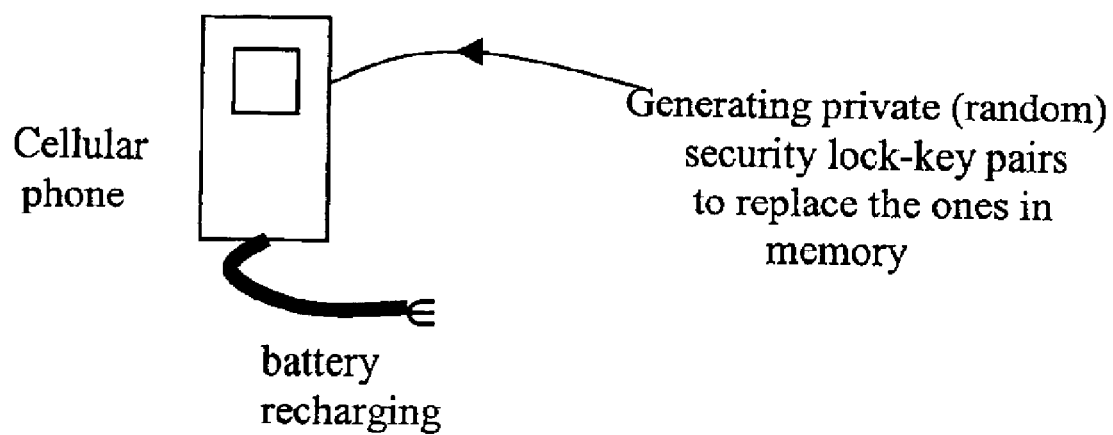
FIG. 12 is a schematic of a cellular phone that receives a computer program capable of generating lock-key pairs using random numbers, in accordance with one embodiment of the present invention.

Referring to FIG. 12, an example of cellular phone that uses an embodiment of the present invention is shown. The cell phone utilizes either dedicated circuitry or a software procedure executed by a microprocessor, or a combination of these, to periodically generate new lock-key pairs to replace the ones in memory, such as when the cell phone is recharging its batteries. The lock-key generation circuitry and/or software may be also used more or less often based on other events, or just by periodic scheduling. The software that generates the lock-key pairs can be transmitted to the phone.

Figure 13:
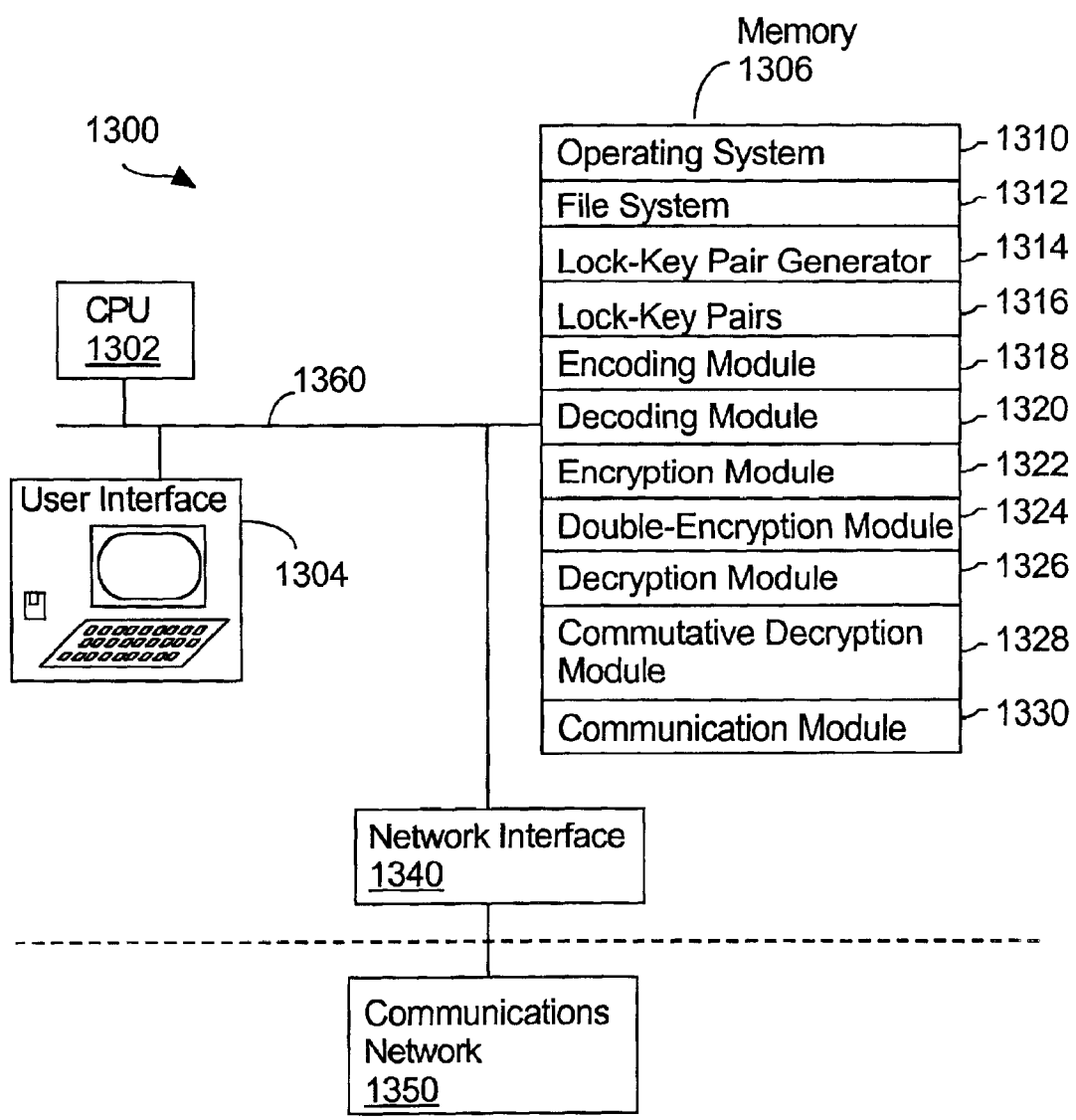
FIG. 13 is a block diagram of a programmed general purpose computer or a computer controlled device that operates in accordance with one embodiment of the present invention.

FIG. 13 shows a computer system, or a microprocessor controlled device 1300 (e.g., a cell phone or personal digital assistant or facsimile machine or the like) capable of practicing the present invention. The system or device 1300 includes one or more central processing units (CPU) 1302, an optional user interface 1304, memory 1306 (including high speed random access memory, and non-volatile memory such as disk storage), and a network interface or other communications interface 1340 for connecting the system or device to other computers or devices on a communications network 1350, to conduct secure communications. These components are interconnected by one or more system busses 1360.

The memory 1306 typically stores an operating system 1310, file system 1312, lock-key pair generator 1314, and lock-key pairs 1316. The memory 1306 furthermore typically stores a set of executable software modules, including encoding module 1318, decoding module 1320, encryption module 1322, double-encryption module 1324, decryption module 1326, commutative decryption module 1328, and communication module 1330. The modules implement the lock-key pair generation, encoding, decoding, encryption and decryption procedures and methodologies described above. In some embodiments, the processing unit(s) 1302 include one or more FIR filters or one or more digital signal processors so as to provide a hardware-based boost to the speed of the encryption and decryption operations.

The memory 1306 may also store further modules and data structures not shown, and is not meant to be limited to only the features identified in the figure. Also, some of the modules depicted as distinct modules may comprise a single module. Further, some of the modules, or aspects of the modules, may also be implemented as hardware components. Other configurations of the hardware and software of the present system, as known by those of skill in the art, are expressly contemplated to be part of the present invention.

The present invention can be also implemented as a computer program product that includes a computer program mechanism embedded in a computer readable storage medium. For instance, the computer program product could contain one or more of the program modules and data structures shown in FIG. 13. These modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for secure transmission of a data message between a sender and a receiver, the method comprising:
    locking, at the sender, the data message using a first lock;
    prior to locking the data message at the sender, encoding the data message, said encoding including partitioning the data message into partition blocks and encoding each partition block by performing one or more operations selected from the set comprising: rearranging data within the block when the partition block matches a first predefined data pattern, expanding the partition block by adding one or more predefined data values when the partition block matches a second predefined data pattern, and expanding the partition by adding a data value obtained by performing a mathematical linear operation on one or more data values within the partition block;
    transmitting the locked data message to the receiver;
    double-locking, at the receiver, the locked data message using a second lock;
    transmitting the double-locked data message back to the sender;
    unlocking, at the sender, the first lock of the double-locked data message using a first key, leaving the data message single-locked by the second lock;
    transmitting the single-locked data message back to the receiver; and
    unlocking, at the receiver, the second lock of the single-locked data message using a second key to generate the data message;
    wherein the locking and unlocking at the sender comprise mathematical linear computations.

2. The method of claim 1, wherein the secure transmission of the data message occurs without a public key exchange.

3. The method of claim 1, wherein the data message unlocked at the receiver is identical to the data message prior to locking at the sender.

4. The method of claim 3, wherein the encoding utilizes a code table.

5. The method of claim 3, further comprising, subsequent to unlocking the second lock of the single-locked and encoded data message, decoding the encoded data message to generate the data message.

6. The method of claim 1, further comprising transmitting from the sender to the receiver a computer program capable of performing the double-locking of the locked data message, and the unlocking of the second lock of the single-locked data message, at the receiver.

7. The method of claim 6, wherein the computer program is a Java applet.

8. The method of claim 1, further comprising transmitting from the receiver to the sender a computer program capable of performing the locking of the data message, and the unlocking of the first lock of the double-locked data message, at the sender.

9. The method of claim 8, wherein the computer program is a Java applet.

10. The method of claim 1, wherein the data message is a secret key.

11. The method of claim 1, wherein the data message is a digital signature.

12. The method of claim 1, wherein the data message is a digital envelope.

13. A method for secure key exchange between a sender and a receiver, the method comprising:
generating a plurality of sender lock-key pairs for the sender and a plurality of receiver lock-key pairs for the receiver;
encrypting, at the sender, a secret key to be transmitted from the sender to the receiver, using one or more locks of the plurality of sender lock-key pairs;
transmitting the sender-encrypted secret key to the receiver;
encrypting, at the receiver, the sender-encrypted secret key using one or more locks of the plurality of receiver lock-key pairs;
transmitting the receiver- and sender-encrypted secret key back to the sender;
decrypting, at the sender, the sender-encrypted portion of the receiver- and sender-encrypted secret key, using one or more keys of the plurality of sender lock-key pairs, leaving the secret key receiver-encrypted;
transmitting the receiver-encrypted secret key back to the receiver;
decrypting, at the receiver, the receiver-encrypted secret key using one or more keys of the plurality of receiver lock-key pairs, to generate the secret key;
encrypting at the sender a data message using the secret key to generate an encrypted data message, and transmitting the encrypted data message to the receiver; and
decrypting at the receiver the encrypted data message using the secret key so as to regenerate the data message at the receiver.

14. The method of claim 13, wherein the data message decrypted at the receiver is identical to the data message prior to encryption at the sender.

15. The method of claim 13, wherein the generating occurs periodically.

16. The method of claim 13, wherein the generating occurs using one or more algorithms, and a plurality of random values as variables for the one or more algorithms.

17. The method of claim 16, wherein the plurality of random values are generated by a random number generator.

18. The method of claim 16, wherein the plurality of random values are generated at least in part by user input.

19. The method of claim 13, wherein the method is used in a portable electronic device, and wherein the generating occurs at least when batteries for the portable electronic device are recharging.

20. The method of claim 13, wherein a representation of each of the plurality of sender lock-key pairs corresponding to the one or more locks used to encrypt the secret key are stored in a memory.

21. The method of claim 13, wherein a representation of each of the plurality of receiver lock-key pairs corresponding to the one or more locks used to encrypt the sender-encrypted secret key are stored in a memory.

22. The method of claim 13, wherein the decrypting of the sender-encrypted portion of the receiver- and sender-encrypted secret key utilizes commutative mathematic operations.

23. The method of claim 13, wherein, prior to the decrypting at the sender, the sender verifies that the receiver- and sender-encrypted secret key was transmitted by the receiver.

24. The method of claim 13, further comprising, prior to encrypting the secret key at the sender, encoding the secret key.

25. The method of claim 24, wherein the encoding utilizes a code table.

26. The method of claim 24, further comprising, subsequent to decrypting the receiver-encrypted and encoded secret key, decoding the encoded secret key to generate the secret key.

27. The method of claim 13, further comprising transmitting from the sender to the receiver a computer program capable of performing the encrypting of the sender-encrypted secret key, and the decrypting of the receiver-encrypted secret key, at the receiver.

28. The method of claim 27, wherein the computer program is a Java applet.

29. The method of claim 13, further comprising transmitting from the receiver to the sender a computer program capable of performing the encrypting of the secret key, and the decrypting of the sender-encrypted portion of the receiver- and sender-encrypted secret key, at the sender.

30. The method of claim 29, wherein the computer program is a Java applet.

31. A method for secure key exchange between a sender and a receiver, the method comprising:
encrypting, at the sender, a secret key to be transmitted from the sender to the receiver, using one or more locks of a plurality of sender lock-key pairs;
transmitting the sender-encrypted secret key to the receiver;
encrypting, at the receiver, the sender-encrypted secret key using one or more locks of a plurality of receiver lock-key pairs;
transmitting the receiver- and sender-encrypted secret key back to the sender;
decrypting, at the sender, the sender-encrypted portion of the receiver- and sender-encrypted secret key, using one or more keys of the plurality of sender lock-key pairs, leaving the secret key receiver-encrypted;
transmitting the receiver-encrypted secret key back to the receiver;
decrypting, at the receiver, the receiver-encrypted secret key using one or more keys of the plurality of receiver lock-key pairs, to generate the secret key;
wherein each lock of the plurality of sender lock-key pairs comprises a plurality of values capable of forming a lock matrix, and further wherein each key corresponding to each lock of the plurality of sender lock-key pairs comprises a plurality of values capable of forming a key matrix, and further wherein the key matrix is the inverse of the lock matrix.

32. The method of claim 31, wherein each lock of the plurality of receiver lock-key pairs comprises a plurality of values capable of forming a lock matrix, and further wherein each key corresponding to each lock of the plurality of receiver lock-key pairs comprises a plurality of values capable of forming a key matrix, and further wherein the key matrix is the inverse of the lock matrix.

33. The method of claim 31, wherein, before encrypting the secret key at the sender, the secret key is partitioned into a plurality of partitioned blocks, and further wherein the encrypting at the sender comprises multiplying each partitioned block of the plurality of partitioned blocks against an encrypting lock of the one or more locks of the plurality of sender lock-key pairs.

34. A method for secure key exchange between a sender and a receiver, the method comprising:

encrypting, at the sender, a secret key to be transmitted from the sender to the receiver, using one or more locks of a plurality of sender lock-key pairs;

transmitting the sender-encrypted secret key to the receiver;

encrypting, at the receiver, the sender-encrypted secret key using one or more locks of a plurality of receiver lock-key pairs;

transmitting the receiver- and sender-encrypted secret key back to the sender;

decrypting, at the sender, the sender-encrypted portion of the receiver- and sender-encrypted secret key, using one or more keys of the plurality of sender lock-key pairs, leaving the secret key receiver-encrypted;

transmitting the receiver-encrypted secret key back to the receiver;

decrypting, at the receiver, the receiver-encrypted secret key using one or more keys of the plurality of receiver lock-key pairs, to generate the secret key;

encrypting at the sender a data message using the secret key to generate an encrypted data message, and transmitting the encrypted data message to the receiver; and decrypting at the receiver the encrypted data message using the secret key so as to regenerate the data message at the receiver;

wherein the secure key exchange occurs between a sender and a plurality of receivers, and further wherein, prior to the decrypting at the sender, the sender verifies that each receiver of the plurality of receivers has transmitted a receiver- and sender-encrypted secret key, and further comprising decrypting, at the sender, the sender-encrypted portion of each of the receiver- and sender-encrypted secret keys transmitted from each receiver of the plurality of receivers.

35. The method of claim 34, wherein if, prior to the decrypting at the sender, the sender receives a greater number of receiver- and sender-encrypted secret keys than the number of the plurality of receivers, the plurality of receivers are warned of a possible adversary and the secure key exchange is canceled.

36. The method of claim 34, wherein if, prior to the decrypting at the sender, the sender receives a lesser number of receiver- and sender-encrypted secret keys than the number of the plurality of receivers, the plurality of receivers are warned of a possible adversary and the secure key exchange is canceled.

37. A secure transmission module for securely transmitting a data message to at least one receiver, the module comprising:

a lock-key pair generator for generating a plurality of lock-key pairs, using one or more algorithms and a plurality of random values as variables for the one or more algorithms;

a first encryption module configured to encrypt a data message using one or more locks of the plurality of lock-key pairs; wherein the data message includes a secret key;

a commutative decryption module configured to decrypt encryption applied by the encryption module to the data message, using one or more keys of the plurality of lock-key pairs, after the data message has been additionally encrypted at least once more at the at least one receiver;

a second encryption module configured to encrypt session messages with the secret key; and a communication module for transmitting encrypted data messages, encrypted session messages and commutatively-decrypted data messages to the at least one receiver, and for receiving additionally-encrypted data messages from the at least one receiver.

38. The secure transmission module of claim 37, wherein the secure transmission of the data message occurs without a public key exchange.

39. The secure transmission module of claim 37, further comprising an encoder for encoding the data message prior to initially encrypting the data message.

40. A secure receiver module for securely receiving a data message from a sender, the module comprising:

a lock-key pair generator for generating a plurality of lock-key pairs, using one or more algorithms and a plurality of random values as variables for the one or more algorithms;

a double-encryption module configured to encrypt an already-encrypted data message using one or more locks of the plurality of lock-key pairs;

a first decryption module configured to recover the data message by decrypting encryption applied by the double-encryption module to a data message, utilizing one or more keys of the plurality of lock-key pairs, to generate the data message from the sender, the decryption occurring after the already-encrypted portion of the data message has been commutatively decrypted at the sender;

a second decryption module for decrypting session messages encrypted with a secret key, wherein the secret key is included in the recovered data message; and a communication module for receiving messages, including already-encrypted data messages, commutatively-decrypted data messages and session messages from the sender, and for transmitting double-encrypted data messages to the sender.

41. The secure receiver module of claim 40, wherein the secure receipt of the data message occurs without a public key exchange.

42. The secure receiver module of claim 40, wherein the data message recovered at the secure receiver module is identical to the data message, prior to encryption at the sender.

43. The secure receiver module of claim 40, wherein the data message is encoded, and further comprising a decoder for decoding the data message upon finally decrypting the data message.

* * * * *

UNITED STATES PATENT AND TRADEMARK OFFICE
CERTIFICATE OF CORRECTION

PATENT NO. : 6,898,288 B2  Page 1 of 1
APPLICATION NO. : 10/154795
DATED : May 24, 2005
INVENTOR(S) : Charles K. Chui It is certified that error appears in the above-identified patent and that said Letters Patent is hereby corrected as shown below:

<u>In the claims:</u>

Column 23, line 49, after "37. A" please insert -- computer controlled device, comprising a central processing unit and memory couple to a central processing unit, the computer controlled device including a --.

Column 23, line 52, please delete "for generating" and insert -- to generate --.

Column 24, line 15, please delete "secure transmission module" and insert -- computer controlled device --.

Column 24, line 18, please delete "secure transmission module" and insert -- computer controlled device --.

Column 24, line 21, after "40. A" please insert -- computer controlled device, comprising a central processing unit and memory coupled to the central processing unit, the computer controlled device, including a --.

Column 24, line 23, please delete "for generating" and insert -- to generate --.

Column 24, line 47, please delete "secure receiver module" and insert -- computer controlled device --.

Column 24, line 50, please delete "secure receiver module" and insert -- computer controlled device --.

Column 24, line 54, please delete "secure receiver module" and insert -- computer controlled device --.

Signed and Sealed this

Sixth Day of November, 2007

JON W. DUDAS
*Director of the United States Patent and Trademark Office*